US006172863B1

(12) United States Patent
Ito et al.

(10) Patent No.: US 6,172,863 B1
(45) Date of Patent: Jan. 9, 2001

(54) PHASE CONTROL SWITCHING SYSTEM

(75) Inventors: Hiroki Ito; Haruhiko Kohyama; Mikio Hidaka, all of Tokyo (JP)

(73) Assignee: Mitsubishi Denki Kabushiki Kaisha, Tokyo (JP)

( * ) Notice: Under 35 U.S.C. 154(b), the term of this patent shall be extended for 0 days.

(21) Appl. No.: 09/339,678

(22) Filed: Jun. 24, 1999

(30) Foreign Application Priority Data

Dec. 21, 1998 (JP) ........................................ 10-362905

(51) Int. Cl.[7] ........................................ H02H 3/18

(52) U.S. Cl. ........................ 361/79; 361/87; 361/93.1; 361/102; 361/110; 361/111; 323/908

(58) Field of Search ........................ 361/79, 87, 110, 361/111, 93.1, 94, 102; 307/116, 130, 131; 323/908

(56) References Cited

U.S. PATENT DOCUMENTS 4,922,363 * 5/1990 Long et al. .............................. 361/3
5,282,125 * 1/1994 Dhyanchand et al. ................. 363/49
5,793,594 * 8/1998 Niemira et al. ..................... 361/93.2

OTHER PUBLICATIONS

"Controlled Closing on Shunt Reactor Compensated Transmission Lines" Part I by Froehlich et al., vol. 12, No. 2, pp. 734–740, IEEE Transaction on Power Delivery, Apr. 1997.

"Controlled Closing on Shun Reactor Compensated Transmission Lines" Part II by Froehlich et al, vol. 12, No. 2, pp. 741–746, IEEE Transactions on Power Delivery, Apr. 1997.

* cited by examiner

*Primary Examiner*—Michael J. Sherry
(74) *Attorney, Agent, or Firm*—Sughrue, Mion, Zinn, Macpeak & Seas, PLLC

(57) ABSTRACT

A phase control switching system for controlling opening and closing timings of a power switching device to suppress the occurrence of an exciting rush current or a make-and-break surge voltage which is severe to system equipment such as a transformer, a reactor and a capacitor bank, or for controlling an arcing time of a circuit breaker to put the circuit breaker into operation for the arcing time leading to no-re-ignition or for the optimal breaking time. In the phase control switching system, a current measuring section or a current gradient measuring section is provided to measure a current value or a current gradient value of a current to be broken or introduced, and a reference phase detecting section estimates a current zero point of a current waveform on the basis of the measurements. Subsequently, a control section, upon receipt of an opening/closing command, an opening phase control operation using an arbitrary time point after the current waveform estimation as a reference.

8 Claims, 16 Drawing Sheets

PHASE CONTROL SWITCHING SYSTEM

BACKGROUND OF THE INVENTION

1. Field of the Invention

The present invention relates to a phase control switching system which controls the switching timing of a power switching device for suppressing exciting rush currents or make-and-break surge voltages severe to system equipment such as a transformer, a reactor and a capacitor bank, or which controls the arcing time (arcing time period) of a circuit breaker to place the circuit breaker into a breaking or interrupting condition for the arcing time leading to no-re-ignition or for the optimal breaking time.

2. Description of the Related Art

In the recent years, there has been a tendency to more frequently use a switching apparatus equipped with an opening and closing (break-and-make) phase control system which suppresses the exciting rush current or switching surge voltage developing at the make or introduction by controlling the switching timing of a power switching device, or which cuts off the power to be supplied from a power bus to a load by controlling the arcing time of a circuit breaker for operating the circuit breaker at the arcing time for no-re-ignition or at the optimal breaking time.

FIGS. 13A and 13B are illustrations of configurations of a conventional circuit breaker opening phase control system disclosed in Japanese Unexamined Patent Publication No. 6-20564. Further, FIG. 14 shows reference (or standard) voltage waveforms at an opening operation of the conventional system and current waveforms in three phases: an R phase, an S phase and a T phase.

In FIG. 13A, a shunt reactor 91 is connected through a circuit breaker 2 to a power bus 5. Further a main section (body) 4 of the circuit breaker opening phase control system includes a reference phase detecting section 41 and control sections 42R, 42S and 42T for R, S and T phases on the power bus 5. A system voltage supplied from the power bus 5 is transformed through an input converter 73 into a voltage necessary for the processing in the interior of the circuit breaker opening phase control system 4, and then inputted to the reference phase detecting section 41.

Now, a description will be given hereinbelow of an operation of the conventional system.

The system voltage inputted from the power bus 5 through a meter transformer 3 is transformed through the input converter 73 into a voltage needed for the processing in the interior of the circuit breaker opening phase control system 4, and then inputted to the reference phase detecting section 41. The reference phase detecting section 41, when an opening command,is given to the circuit breaker 2, detects the voltage zero point of a reference phase voltage as shown in FIG. 14, thereby setting a periodic voltage zero point which produces a reference.

Furthermore, the point of time (time point) delayed by ¼ cycle with respect to the voltage is set as a periodic current zero point. Simultaneously, the reference phase detecting section 41 outputs a signal to the respective phase control sections 42R, 42S, 42T, each of which calculates an opening operation time (CB opening time) in each of the R, S and T phases from the point of time of the opening command to the circuit breaker 2 to the point of time of CB opening start.

Subsequently, the reference phase detecting section 41 calculates an operating synchronization time (control time) so that the current zero occurs after the elapse of a predetermined arcing time (the time from the CB opening time to the final breaking time) at which each of the R, S and T phases provides the no-re-ignition.

In this case, a desired current zero point (breaking point) is set which is estimated after the elapse of a breaking time comprising a predetermined arcing time (2) plus an opening operation (CB opening) time (1) from a reference voltage zero point. Following this, calculated is an operating synchronization time (control time) ((3)+(4)) obtained by subtracting the breaking time ((1)+(2)) from a finish time ((1)+(2)+(3)+(4)) which is from the reference voltage zero point to the desired current zero point, where (3) designates a phase difference of a current of each phase flowing in a shunt reactor from an input voltage (R phase voltage) (90° for the R phase, 210° for the S phase and 330° for the T phase). Further, symbol (4) denotes a correction time needed for the final breaking point to reach the current zero point of each phase.

In addition, the reference phase detecting section 41 outputs a control operation command for the circuit breaker 2 to the control section 42 for the corresponding phase after the elapse of the operating synchronization time from the reference voltage zero point, thus starting the operation of the circuit breaker 2.

The circuit breaker 2, starting its operation in response to this control, makes the separation of its contacts after the elapse of the opening operation time, and the final breaking point occurs in terms of each of the R, S and T phases after the predetermined arcing time (2). If this opening method is applied to a closing phase control system, since control to break at the point of time the insulation distance between the contacts of the circuit breaker 2 is sufficiently securable in each phase becomes feasible, the re-ignition becomes hard to generate.

FIG. 13B shows the addition of an averaged period measuring section 44 to the circuit breaker opening phase control system 4 shown in FIG. 13A. The other arrangement is the same as that of FIG. 13A. A single phase voltage input (V) is inputted through an input converter 43 to the averaged period measuring section 44. The averaged period measuring section 44 measures the time corresponding to each cycle of the input voltage to obtain an average period from the times obtained by measuring several times. Further, the averaged period measuring section 44 outputs a signal equivalent to the average period (a signal by which the zero point of the input voltage is found, such as a sine wave or a square wave). The following operation is identical to that of the system shown in FIG. 13A.

FIG. 15 illustratively shows a current waveform to be taken for when a conventional circuit breaker opening phase control system detects a current zero point and implements the opening phase control, and the timings for operations and the times.

A stand-by time plus an operating motive time correspond to a control time, an operation time corresponds to a CB opening operation, a contact separation time point corresponds to a CB opening start point, and a desired breaking point corresponds to a final breaking point.

Furthermore, FIG. 16 shows an operational sequence of the circuit breaker opening phase control system taking this breaking operation.

When the circuit breaker 2 receives an opening command, the reference phase detecting section 41 takes a system current to be broken from a meter current transformer CT in the interior of the current measuring section 71 to measure the current zero time point, thereafter calculating a current zero time point Tai in each phase.

At the same time, the opening and closing control section 42 for each phase receives an ambient temperature Temp of an operating mechanism from a temperature measuring section 51, an operating pressure or spring operating force Edrive from an operating force measuring section 52 and a control voltage Vcontrol from a control voltage measuring section 53 in a control room to calculate an operation time Topen given in advance as a function of these. Further, an arcing time Tarc is previously set to a predetermined time.

Following this, on the basis of the calculated current zero time point Tai, a reference (standard) point Tstandard of the opening operation start is set from a current zero point estimated to appear at the point of time of the occurrence of an opening command for the circuit breaker 2. Subsequently, a desired breaking point Ttarget is set from a current zero point estimated in like manner. At this time, an operating synchronization time Tconst is calculated according to an equation (Ttarget−Tstandard−Topen+Tarc) so that a breaking point occurs at a predetermined arcing time tarc. Further, a control opening command is outputted to the circuit breaker 2 at an operation starting time point Topen after the elapse of the operating synchronization time Tcont from the reference point Tstandard so that the opening operation of the circuit breaker 2 starts.

In consequence, a contact separation time point Tseparate is reached at the point of time of the elapse of the operation time Topen, and the opening is completed when a desired breaking point Tinterrupt after the elapse of the arcing time tarc.

However, in the case where the voltage and current zero points are taken as references through the use of the conventional system, the reference point can be taken only at every 0.5 cycle (every 10 ms in a 50-Hz system, every 8.3 ms in a 60-Hz system). For this reason, difficulty is experienced in using it for short-circuit fault current breaking control in which a reference time is required to be set for a shorter time and with higher accuracy.

In addition, in the case where the short-circuit fault current involves a direct-current component, particularly in the case where the direct-current component is in a large quantity, since a periodic current zero point does not occur, which creates a problem in that, if employing the method taken in the conventional system, it is impossible to set a current zero point to be used as a reference or standard.

Meanwhile, in the circuit breaker, the internal inspection for replacing expendable parts has been made when they reach a predetermined number of times of use, such as the frequency of short-circuit fault current interruption, the frequency of reactor bank switching and the frequency of capacitor bank switching. In the recent years, for the requirements on maintenance cost reduction to reach satisfaction, there is a need for a technique to diagnose the satisfactory quality of, particularly, contacts or insulating nozzles which form replaceable parts. However, the conventional system does not have a function to check the quality or health of the circuit breaker, so the maintenance and inspection take time.

SUMMARY OF THE INVENTION

Accordingly, the present invention has been developed in order to eliminate these problems, and it is an object of this invention to provide a phase controlled switching system having a function to recognize the current zero point of an accident current waveform more quickly with high accuracy, a means for conducting the control switching of an asymmetrical current, and a function to make a diagnosis on the quality of a circuit breaker.

According to one aspect of the present invention, a phase control switching system comprises a power switching device provided in a power system for breaking a current including a short-circuit fault current and a load current or introducing it into a system voltage in response to an opening and closing command, waveform measuring means for measuring one of a voltage waveform and a current waveform the power switching device makes and breaks, current zero point estimating means for estimating a plurality of zero points of a current with a commercial frequency on the basis of the measured one of the voltage waveform and the current waveform, parameter measuring means for measuring parameters which affect an operation time of an operating mechanism of the power switching device, operation time estimating means for estimating an opening operation time of the power switching device on the basis of the measured parameters, current zero point selecting means for setting a breaking time comprising a predetermined arcing time plus the opening operation time, so that a breaking point forming a current zero point is reached at the point of time of the elapse of the predetermined arcing time, the zero point selecting means being further operable to select that one current zero point from the plurality of current zero points which is estimated to occur after the elapse of the set breaking time from a present reference time point to set the selected current zero point as a desired breaking point and operation starting means for calculating an operating synchronization time on the basis of the breaking time and a difference between a time from the present reference time point to the desired breaking time, and for outputting a control operation command to the power switching device after the elapse of the operating synchronization time from the reference time point so that the power switching device starts its operation.

In a preferred form of this invention, the phase control switching system includes current waveform estimating means for measuring a current to be broken on the basis of the current waveform measured by the waveform measuring means and further for calculating a wave height of an alternating-current component of the breaking current, a current phase thereof, a direct-current component thereof to be superimposed on the breaking current and an attenuation time constant of the direct-current component on the basis of the measured current to estimate an asymmetrical current waveform, wherein the current zero point selecting means sets the breaking time to the predetermined arcing time plus the opening operation time, so that the current zero point is reached at the elapse of the predetermined arcing time, and selects one current zero point from the plurality of current zero points calculated on the basis of, a wave height value of an alternating-current component of the breaking current occurring after the elapse of the breaking time set from an arbitrary reference time point, a current phase thereof, a direct-current component thereof to be superimposed on the breaking current and the attenuation time constant of the direct-current component, and sets the selected current zero point as the desired breaking point.

In accordance with another aspect of the present invention, in the case where one of an accident current and a load current is broken, an effective value of the breaking current is estimated so that the arcing time from an opening time point to the current zero point is set to take a minimum length within an arcing time range where the power switching device achieves breaking, or so that the breaking is made for the arcing time that maximizes a breaking performance of the power switching device.

In a further preferred form of the invention, in the case where an excessive accident current exceeding a rated value flows, the arcing time is set to maximize the breaking performance of the power switching device and a decision is made on whether the breaking is possible or not, before an operation command is issued.

In a still further preferred form of the invention, in the case where at least one of a short-circuit fault current, a leading current and a reactor current is broken, the opening time point is set to the current zero point.

In accordance with a further aspect of the present invention, a power switching device provided in a power system for breaking a current including a short-circuit fault current and a load current or introducing it into a system voltage in response to an opening and closing command, voltage waveform measuring means for measuring one of a voltage waveform and a current waveform the power switching device makes and breaks, voltage zero point estimating means for estimating the time points of a plurality of periodic inter-pole voltage zero points on the basis of the measured one of the voltage waveform and the current waveform, means for measuring parameters including main temperatures, an operating force and a control voltage which affect an operation time of an operating mechanism of the power switching device, operation time estimating means for estimating an opening operation time on the basis of the measured parameter values, make time setting means for, in consideration of a predetermined previous arcing time, setting a make time obtained by subtracting the previous arcing time from a closing operation time so that the power switching device is electrically turned on at a predetermined make time point, desired breaking point selecting means for selecting one time point from make electric angles set to occur after the elapse of the set make time from a present reference time point and for setting the selected time point as a desired breaking point, and operation starting means for subtracting the make time from a time from the present reference time point to the desired breaking point and further for adding the previous arcing time to the subtraction result to calculate an operating synchronization time, and still further for issuing a control operation command to the power switching device at the point of time of the elapse of the operating synchronization time from the reference time point to start an operation of the power switching device.

In accordance with a still further aspect of the invention, the phase control switching system comprises inter-pole voltage measuring means for measuring, from an inter-pole voltage obtained by making a subtraction between a movable side voltage waveform and a fixed side voltage waveform in the power switching device measured by the voltage waveform measuring means, an amplitude of the inter-pole voltage and an inter-pole voltage zero point thereof, and make time point setting means for, when the measured inter-pole voltage amplitude varies, estimating a time period in which the amplitude becomes the lowest and a voltage zero point in the time period to set the voltage zero point as a make time point, wherein the desired breaking point selecting means, in consideration of the predetermined previous arcing time, sets the make time obtained by subtracting the previous arcing time from the closing operation time so that the power switching device is electrically turned on at the set make time point, and further, selects one time point from the make electric angles set to occur after the elapse of the set make time from the present reference time point to set the selected time point as the desired breaking point.

In a further preferred form of the invention, the phase control switching system comprises operational characteristic measuring means for measuring a puffer pressure variation characteristic and an operational characteristic when the power switching device is in operation, decision means for deciding whether or not at least one of a rise value of the puffer pressure and an operating speed is out of a predetermined reference range, operational characteristic estimating means for estimating at least one of the next puffer pressure or operational characteristic on the basis of a past operation record, and display means for, when the next operational characteristic is estimated to be out of the predetermined reference range, displaying an inspection timing for replacement of expendable parts in the power switching device and the necessity for inspection of the operating mechanism.

BRIEF DESCRIPTION OF THE DRAWINGS

The above and other objects and features of the present invention will become more readily apparent from the following detailed description of preferred embodiments of the invention taken in conjunction with the accompanying drawings in which.

DESCRIPTION OF THE PREFERRED EMBODIMENTS

First Embodiment

Figure 1:
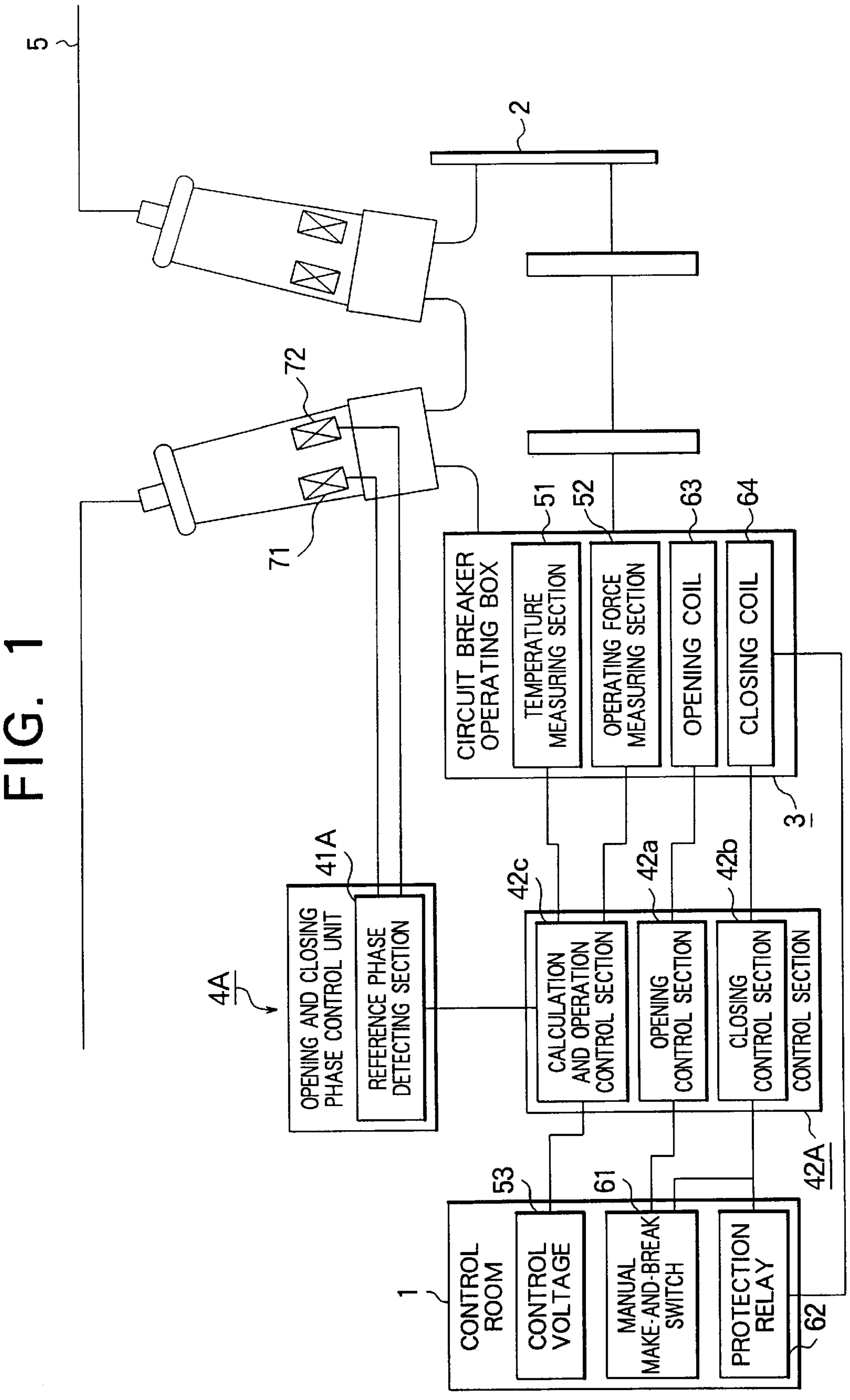
FIG. 1 is an illustration of a configuration of a phase control switching system according to a first embodiment of this invention.

Referring to the drawings, a description will be made hereinbelow of a phase control switching system according to a first embodiment of the present invention.

Figure 2:
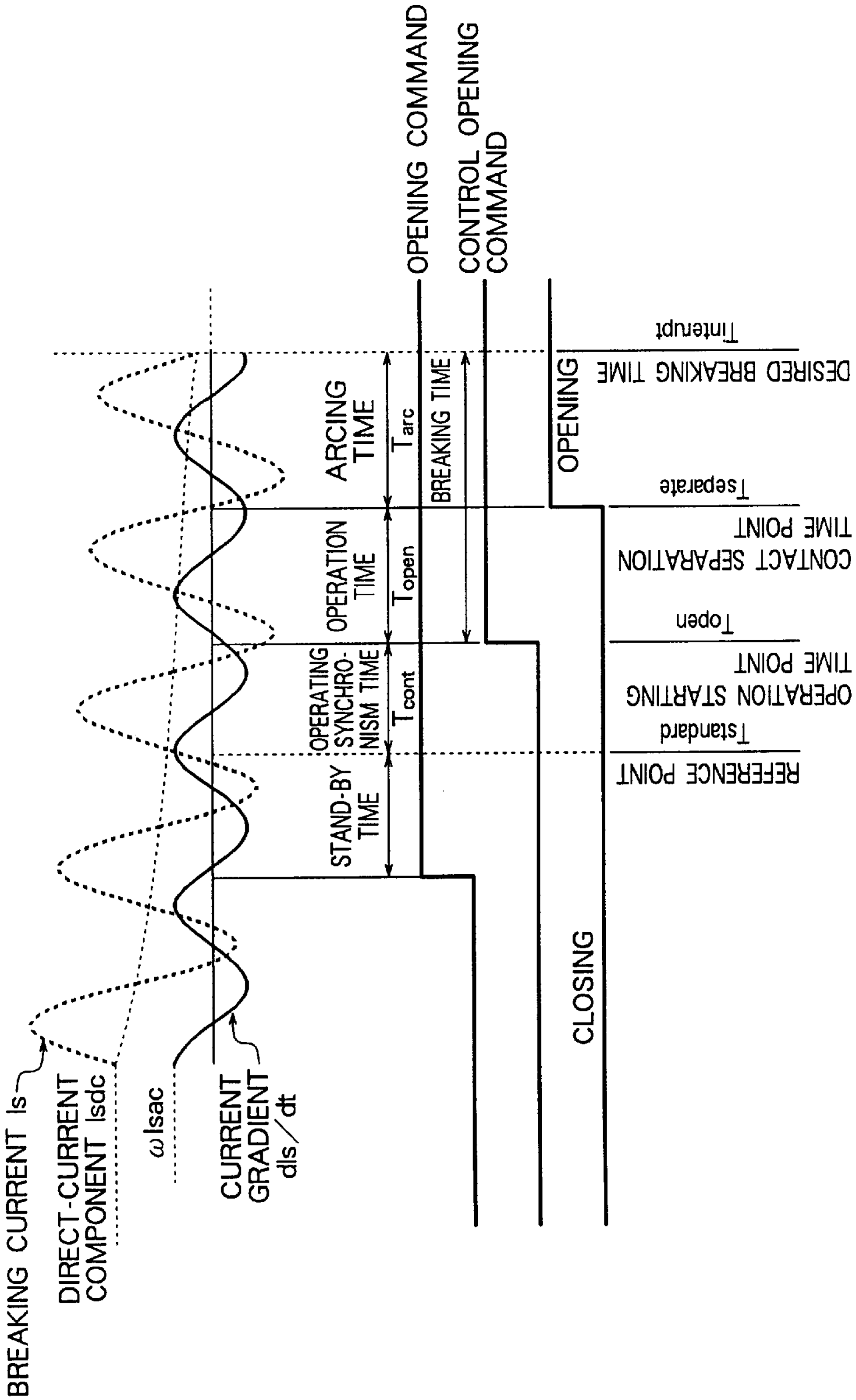
FIG. 2 illustratively shows a reference current waveform (asymmetrical current), an operating time point and an operation time at an opening operation by the phase control switching system according to the first embodiment.
Figure 3:
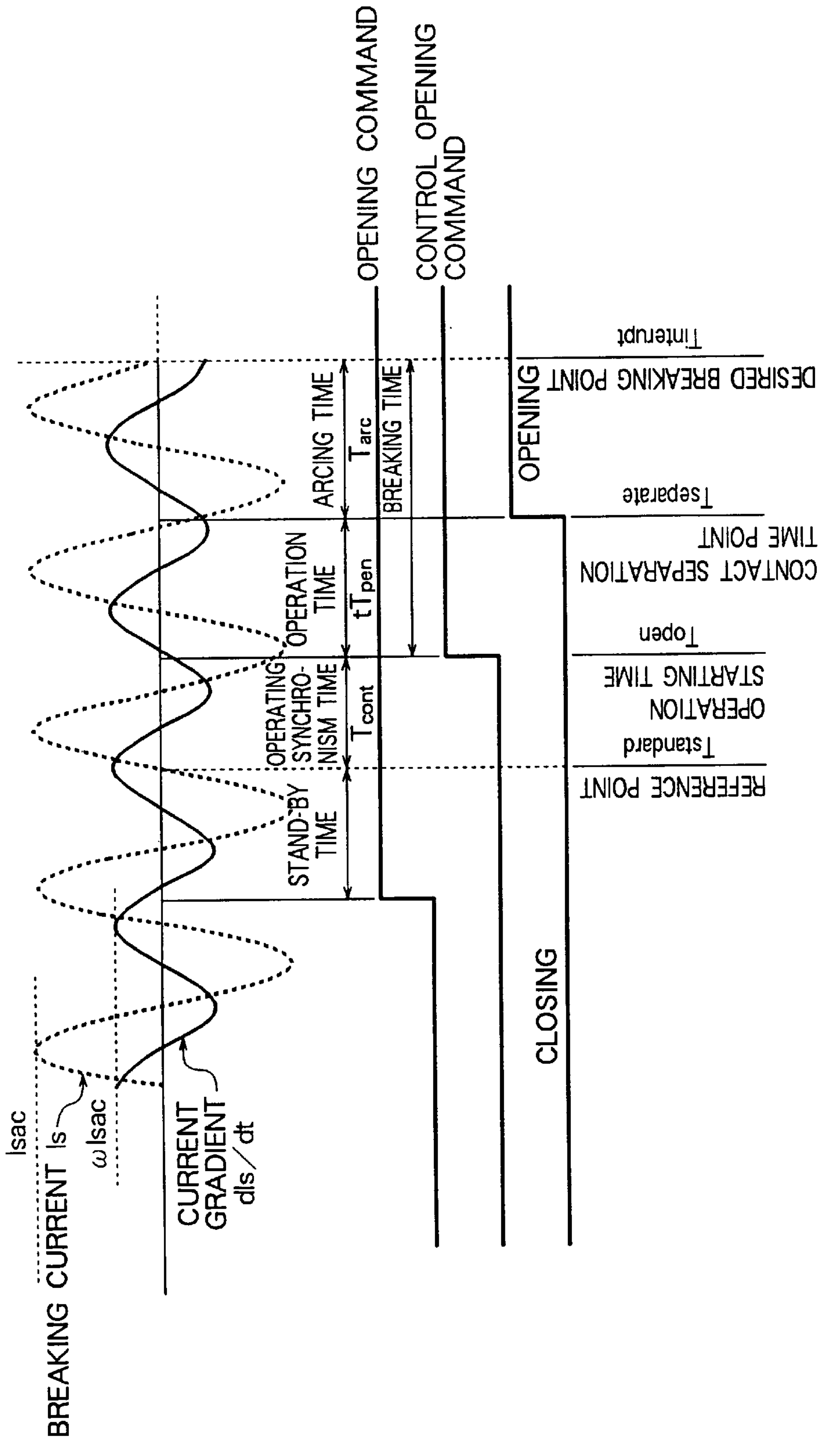
FIG. 3 illustratively shows a reference current waveform (asymmetrical current), an operating time point and an operation time at an opening operation by a phase control switching system according to a second embodiment of this invention.

FIG. 1 illustrates a phase control switching system according to this embodiment, and a circuit breaker, and FIG. 2 illustratively shows a reference current waveform, an operating time point and an operation time at an opening operation.

In FIG. 1, a control room 1 includes a control voltage measuring section 53 for measuring a control voltage, a manual make-and-break switch 61 for giving an opening command to an opening and closing phase control unit 4A which will be described herein later, and a protection relay 62 for supplying an operating command to a breaking mechanism in such a manner as to bypass the opening phase control unit.

A circuit breaker 2 is connected to a power system 5, and a circuit breaker operating box 3 contains a mechanism for operating the circuit breaker 2. This circuit breaker operating box 3 is equipped with a temperature measuring section 51 for measuring an ambient temperature around the operating mechanism, an operating force measuring section 52 for measuring an operating force of the circuit breaker 2, an opening coil 63 for placing the circuit breaker 2 into an open condition, and a closing coil 64 for placing the circuit breaker 2 into a closed condition.

An opening and closing phase control unit 4A comprises a reference phase detecting section 41A for detecting a reference (standard) phase on each of phases in the power bus 5 and a control section 42A for the phases. The control section 42A is composed of a calculation and operation control section 42*c* for calculating an operation time and others of the circuit breaker 2, an opening control section 42*a* for issuing a control opening command to the opening coil 63, and a closing control section 42*b* for issuing a control closing command to the closing coil 64. Further a current measuring section 71 measures a current flowing between terminals of the circuit breaker 2, and a current gradient measuring section 72 measures a current gradient between the terminals of the circuit breaker 2.

Now, a description will be given hereinbelow of an operation of this embodiment based upon the above-described configuration.

The current flowing between the fixed side and movable side terminals of the circuit breaker 2 or a current gradient is measured by the current measuring section 71 or the current gradient measuring section 72, and the measured current value or current gradient value is converted into a voltage which in turn is inputted to the reference phase detecting section 41A.

In the case where the direct-current component of the current thus measured is imperceptible when an opening command is given to the circuit breaker 2, the reference phase detecting section 41A measures the current zero time point and the current gradient zero time point of each of the phases, thereby detecting a reference point Tstandard at every ¼ of a cycle.

Furthermore, in the case where the direct-current component Isdc of a breaking current Is is large as shown in FIG. 2, the reference phase detecting section 41A measures a current value at the current gradient zero time point or current values at the maximum and minimum current gradient values in each phase to detect a reference phase current waveform (that is, of asymmetrical breaking current, a wave height of an alternating-current component, a breaking current phase, a direct-current component to be superimposed on the breaking current and an attenuation time constant of the direct-current component on the basis of these measurements).

The calculation and operation control section 42*c* for each phase sets the time point, i.e., the reference point Tstandard, serving as the references for the current zero point or the like estimated on the basis of the measured reference (current and current gradient) zero point at every ¼ cycle or the measured reference phase current waveform (that is, of asymmetrical breaking current, a wave height of an alternating-current component, a breaking current phase, a direct-current component to be superimposed on the breaking current and an attenuation time constant of the direct-current component) as shown in the timing chart of FIG. 2.

At the same time, the reference phase detecting section 41A outputs a signal to the calculation and operation control section 42*c* to calculate an opening operation time Topen of the circuit breaker 2 in the corresponding phase. Subsequently, the calculation and operation control section 42*c* sets a desired breaking point Tinterrupt to be estimated after the elapse of a breaking time comprising a predetermined arcing time Tarc plus the opening operation time Topen, from the reference point Tstandard so that the zero point is reached at the point of time of the elapse of a predetermined arcing time where no-re-ignition occurs in each phase or the arcing time Tarc optimal in breaking a short-circuit fault current.

Following this, the calculation and operation control section 42*c* calculates an operating synchronization time (control time) Tcont by subtracting the breaking time from the time which is from the reference point Tstandard to the desired breaking point Tinterrupt, and outputs a control operation command to the circuit 2 at an operation starting time point Topen coming when the operating synchronization time Tcont is elapsed from the reference point Tstandard, thereby starting the operation of the circuit breaker 2.

The circuit breaker 2 after starting its operation under such breaking control, separates its contacts at a contact separation time point Tseparate after the elapse of the opening operation time Topen, and in each phase, the desired breaking point Tinterrupt is reached at the point of time of the elapse of the predetermined arcing time tarc. If the phase control switching control system according to this embodiment is used for the opening operation of the circuit breaker 2, at the shunt reactor breaking, the insulation distance between the contacts of the circuit breaker 2 in each phase is sufficiently securable, so that control for conducting the breaking at the time point of no occurrence of re-ignition becomes feasible.

Furthermore, at the breaking of the short-circuit fault current, it is possible to execute control to accomplish the breaking in the arcing time Tarc where the circuit breaker 2 provides the highest breaking performance or in the minimum arc time Tarc in each phase (R phase, S phase, T phase).

Still further, in the case of breaking the short-circuit fault current, the leading current or the reactor current, the opening time point is set to the current zero point, whereby, in the shunt reactor or at the leading small current breaking, the insulation distance between the contacts of the circuit breaker in each phase is sufficiently securable, and all the phases can be cut off in the arcing time Tarc of ½ cycle which causes no occurrence of re-ignition. Additionally, at the breaking of the short-circuit fault current, each phase can be broken in the arcing time Tarc of 1 cycle where the circuit breaker 2 offers the highest breaking performance.

Second Embodiment

Figure 4:
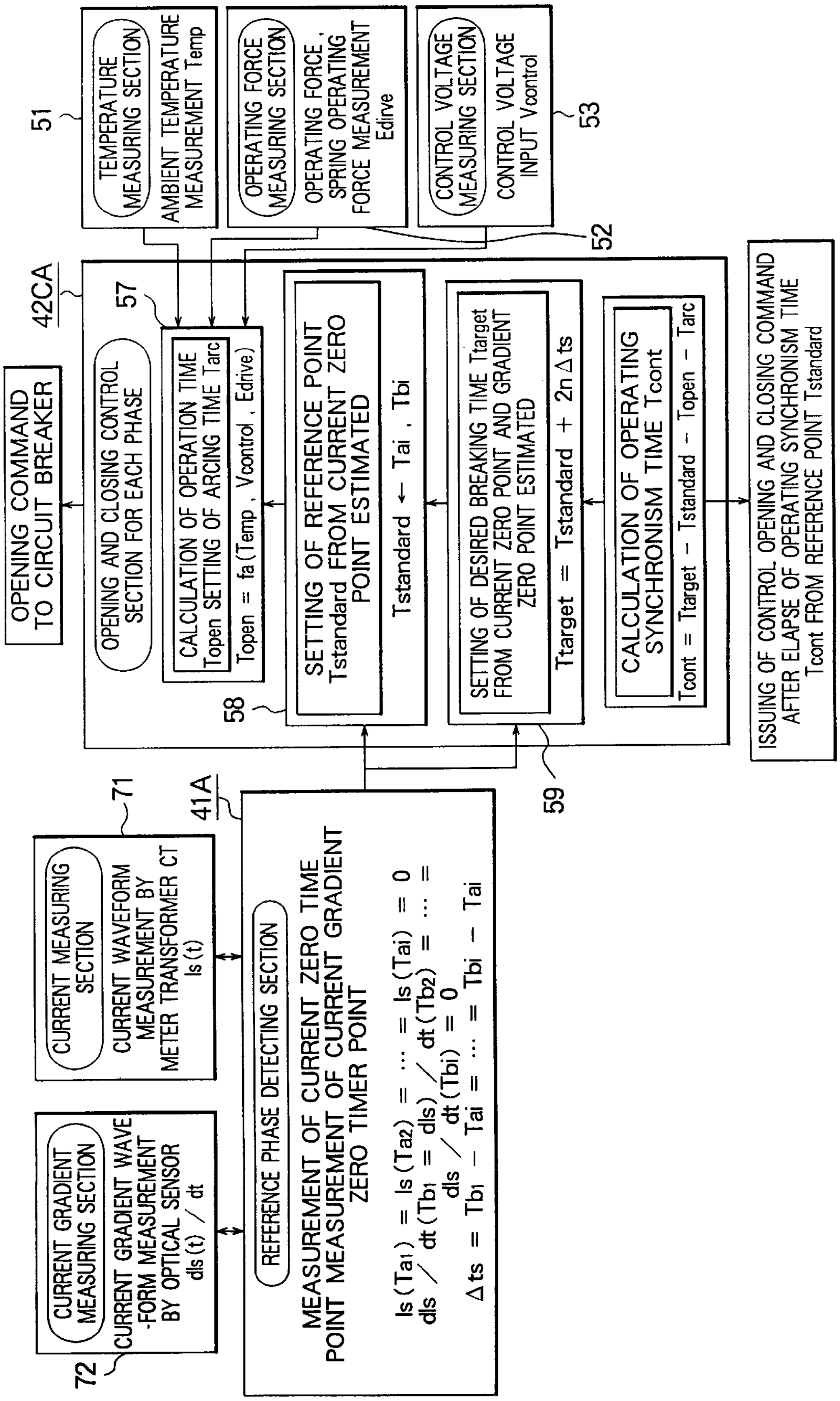
FIG. 4 is an illustration of an opening operation sequence to be taken for when a symmetrical current is cut off by the phase control switching system according to the second embodiment.

FIG. 4 shows an opening operation sequence for a circuit breaker by a phase control switching system according to this invention in the case of breaking a symmetrical current (a breaking current having a small direct-current component). When the circuit breaker 2 receives an opening command, a reference waveform phase detecting section 41A receives system currents to be broken from a current measuring section 71 comprising a meter current transformer, an optical fiber or the like and a current gradient measuring section 72 to detect the time points of a current zero point and a current gradient zero point, thereafter measuring a current zero time point Tai and a current gradient zero time point Tbi at every ¼ cycle.

At the same time, an opening and closing control section 42CA, included in the calculation and operation control section 42*c* in FIG. 1, receives an operating pressure or spring operating force Edrive from an operating force measuring section 52 and a control voltage Vcontrol from a control voltage measuring section 53 in the control room 1 to calculate an operation time Topen given as a function of these in advance. Further, a predetermined arcing time Tarc is set in advance.

Following this, a reference point Tstandard is set from a current zero point estimated to appear at the time of the occurrence of an opening command to the circuit breaker 2 on the basis of the current zero time point Tai and the current gradient zero time point Tbi measured by the reference phase detecting section 41A. Subsequently, likewise, a desired breaking point Ttarget is set from the estimated current zero point and the current gradient zero point Tbi. In this case, an operating synchronization time Tcont is calculated so that the breaking point is reached at the predetermined arcing time Tarc, and a control opening and closing command is outputted to the circuit breaker 2 at an operation starting time point Topen reached after the elapse of the operating synchronization time Tcont the set reference point Tstandard, thereby starting the opening operation of the circuit breaker 2.

As a result of this, in the circuit breaker 2, the contacts thereof are separated at a contact separation time point Tseparate after the opening operation time Topen, and each phase encounters a desired breaking point Tinterrupt after the predetermined arcing time tarc.

By conducting this opening method, as compared with the conventional unit in which a voltage and current zero points are used as references so that the reference point Tstandard is reached at every ½ cycle (every 10 ms in a 50-Hz system, every 8.3 ms in a 60-Hz system), the reference point Tstandard is reached at every ¼ cycle (every 5 ms in a 50-Hz system, every 4.2 ms in a 60-Hz system) and, therefore, for the opening control, the reference time point or the arcing time Tarc can be set with higher accuracy for a shorter time period.

Third Embodiment

Figure 5:
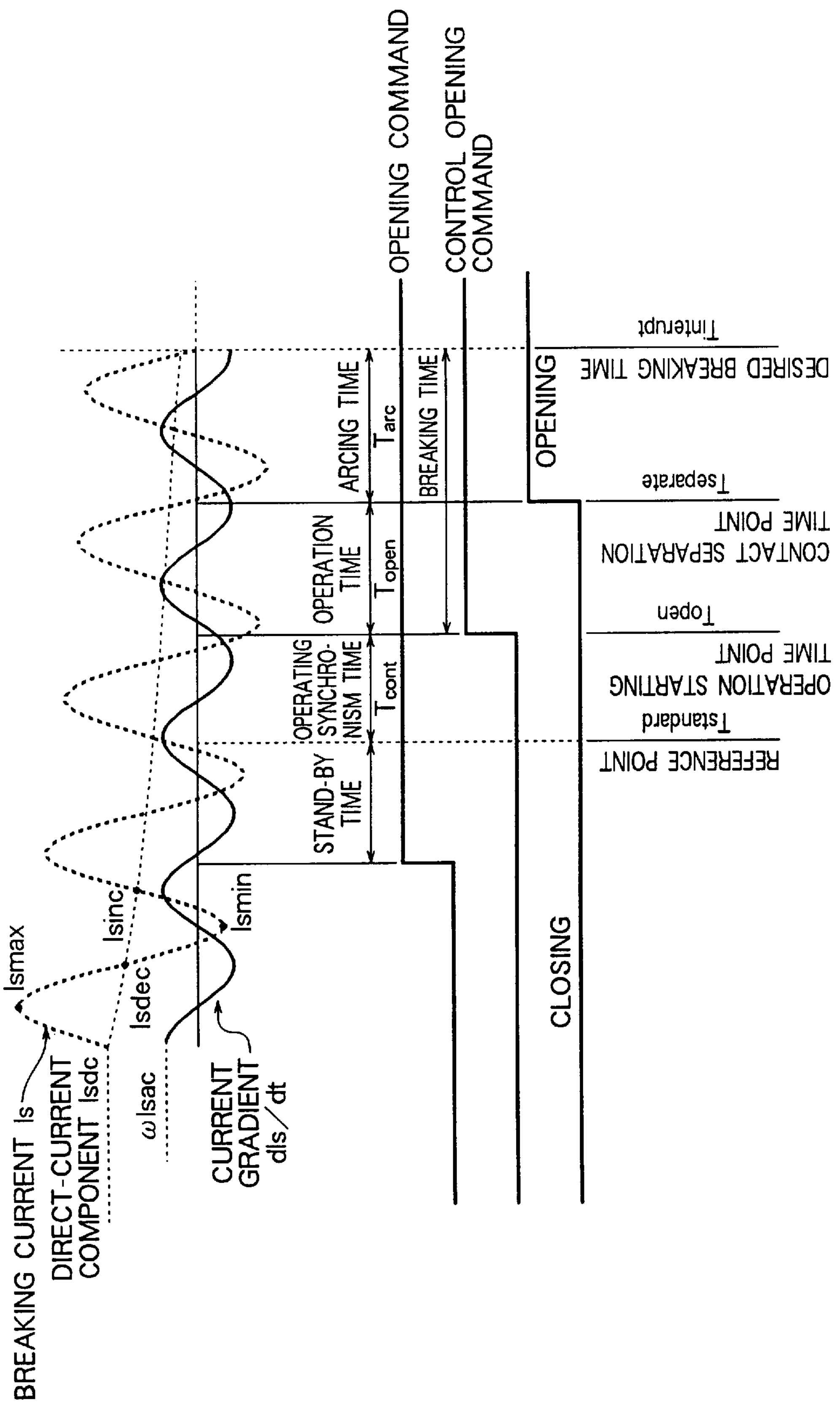
FIG. 5 illustratively shows a reference current waveform (asymmetrical current), an operating time point and an operation time at an opening operation by a phase control switching system according to a third embodiment of this invention.
Figure 6:
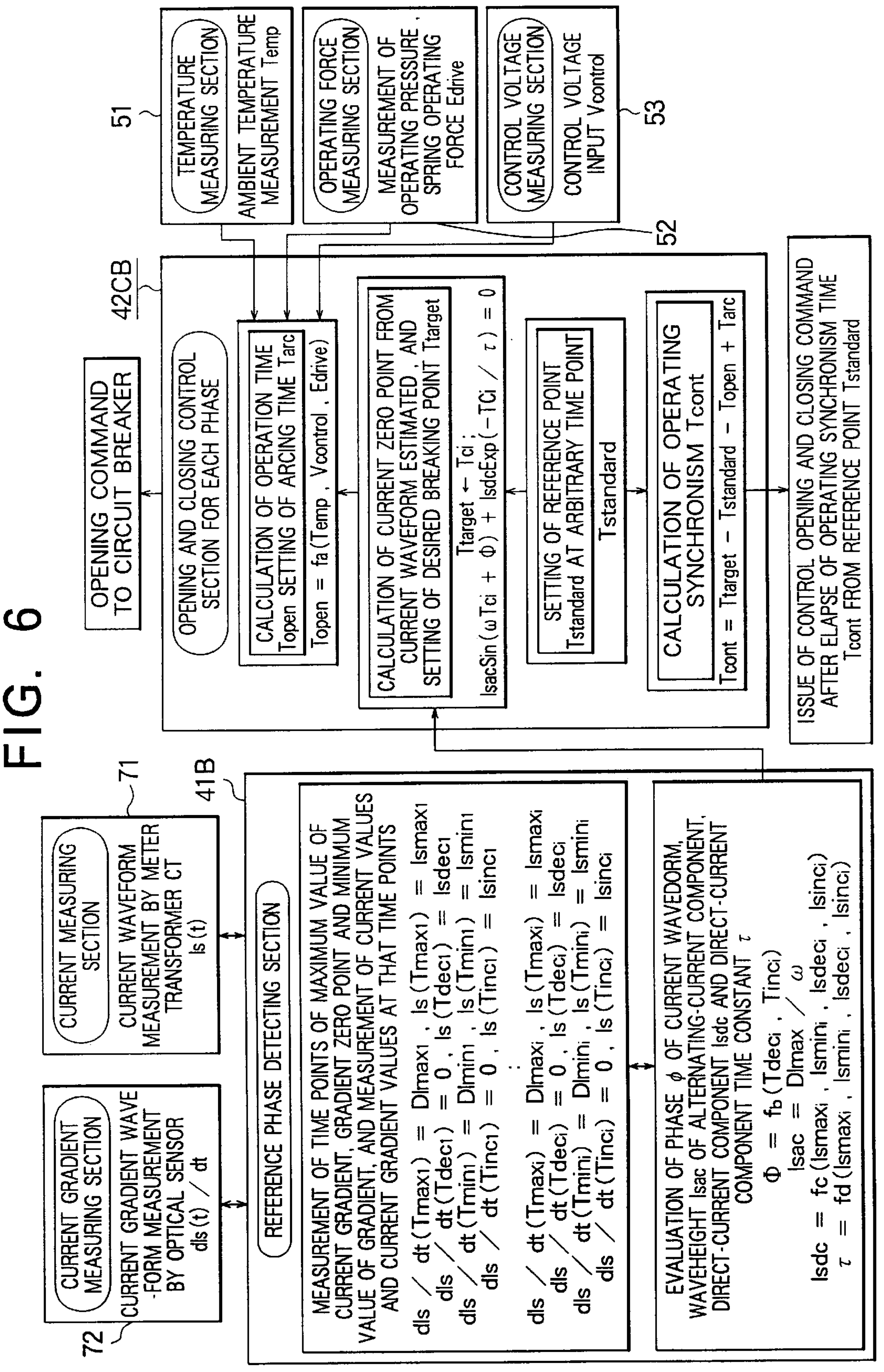
FIG. 6 is an illustration of an opening operation sequence to be taken for when an asymmetrical current is cut off by the phase control switching system according to the third embodiment.

FIG. 6 shows an opening operation sequence for a circuit breaker by a phase control switching system according to this embodiment in the case of breaking asymmetrical current (a breaking current including a large direct-current component) that the time interval between current zero points in a current waveform illustrated in FIG. 5 is in an aperiodic condition.

When the circuit breaker 2 receives an opening command, as well as the case shown in FIG. 1, a reference phase detecting section 41B receives system currents to be broken from a current measuring section 72 comprising a meter current transformer, an optical fiber or the like and a current gradient measuring section 71, thereby measuring the time point at which the current gradient comes to a maximum, the time point of the gradient zero point and the time point at which the gradient comes to a minimum and further measuring the current values and the current gradient values at these time points as follows.

$$dIs/dt(T\max1)=DI\max1,\ Is(T\max1)=Is\max1,\ dIs/dt(T\mathrm{dec}1)=0,\ Is(T\mathrm{dec}1)=Is\mathrm{dec}1,\ dIs/dt(T\min1)=DI\min1,\ Is(T\min1)=Is\min1,\ dIs/dt(T\mathrm{inc}1)=0,\ Is(T\mathrm{inc}1)=Is\mathrm{inc}1.$$

$$dIs/dt(T\max i)=DI\max i,\ Is(T\max i)=Is\max i,\ dIs/dt(T\mathrm{dec}i)=0,\ Is(T\mathrm{dec}i)=Is\mathrm{dec}i,\ dIs/dt(T\min i)=DI\min i,\ Is(T\min i)=Is\min i,\ dIs/dt(T\mathrm{inc}i)=0,\ Is(T\mathrm{inc}i)=Is\mathrm{inc}i.$$

On the basis of this measurement result, calculated are a phase $\phi$, an alternating-current component wave height Isac, a direct-current component Isdc and a direct-current time constant $\tau$ in asymmetrical current waveform $(Is=Isac\sin(\omega Tci+\phi)+Isdc\exp(-TCi/\tau)=0)$.

Simultaneously, an opening and closing control section 42CB receives an ambient temperature Temp around an operating mechanism from a temperature measuring section 51, an operating pressure or spring operating force Edrive from an operating force measuring section 52 and a control voltage Vcontrol from a control voltage measuring section 53 in a control room 1 to calculate an operation time Topen of the circuit breaker 2 given as a function of these in advance. Further, a predetermined arcing time Tarc is set in advance.

Subsequently, the opening and closing control section 42CB solves the equation $(Is=Isac\sin(\omega Tci+\phi)+Isdc\exp(-TCi/\tau)=0)$ on the basis of an asymmetrical current waveform to be estimated to appear at an opening command to the circuit breaker, from the calculated phase $\phi$, alternating-current component wave height Isac, direct-current component Isdc and direct-current time constant $\tau$ of the asymmetrical current waveform $(Is=Isac\sin(\omega Tci+\phi)+Isdc\exp(-TCi/\tau)=0)$, thereby calculating a plurality of aperiodic current zero points Tci for setting a desired breaking point Ttarget. Then, a reference point Tstandard at an arbitrary time point is set.

At this time, the operating synchronization time Tcont is calculated from an equation (Ttarget−Tstandard−Topen+Tarc) so that the breaking point is reached at the point of time of the elapse of the predetermined arcing time Tarc, and after the elapse of the operating synchronization time Tcont from the reference point Tstandard, a control opening and closing command is outputted to the circuit breaker 2 to start the opening operation of the circuit breaker 2.

By performing this opening control method, not only the aperiodic current zero points of the asymmetrical current can be estimated, but also the reference time point can be set with higher accuracy for a shorter time period with an arbitrary time point being set as a reference point.

Fourth Embodiment

Figure 7:
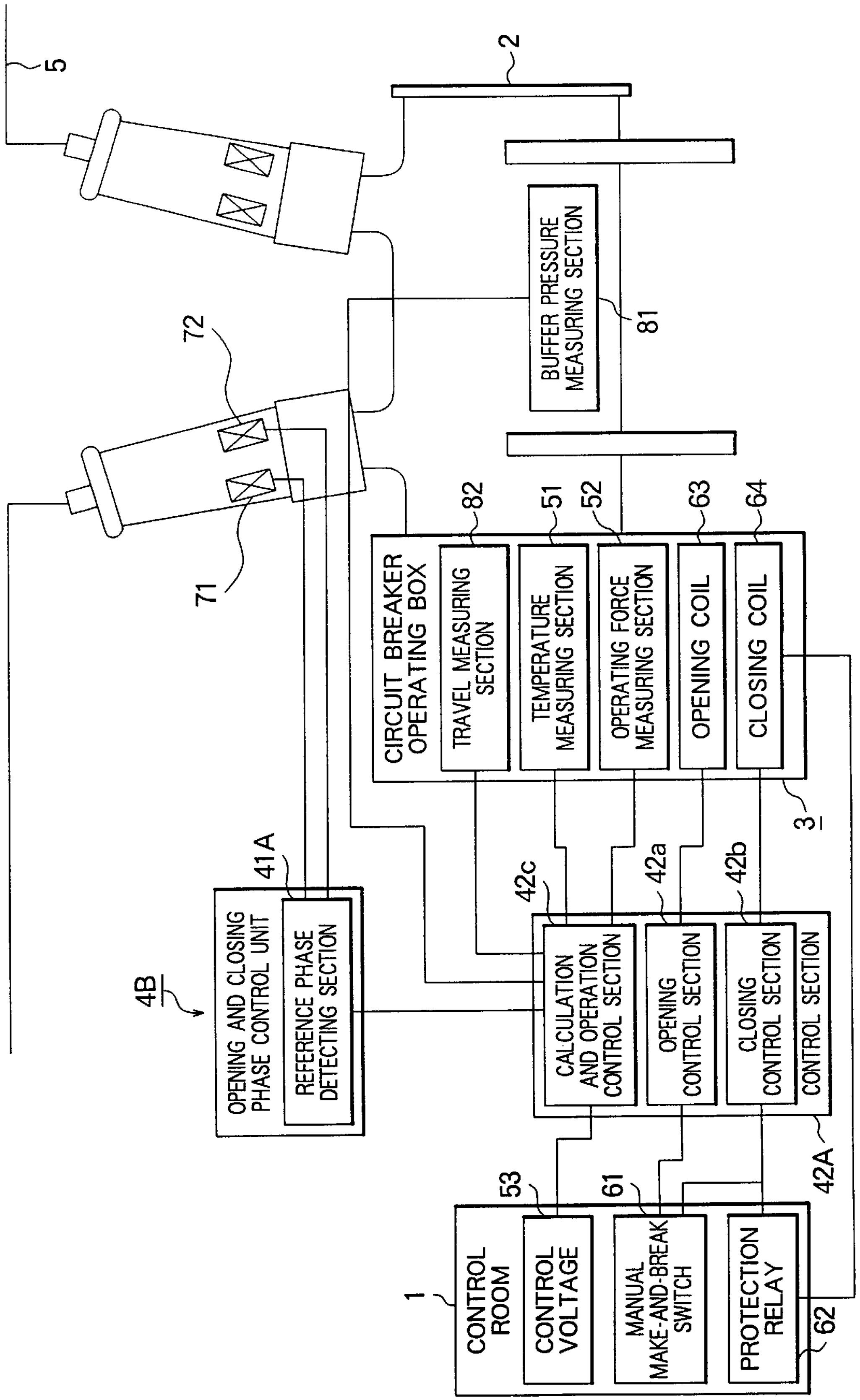
FIG. 7 is an illustration of a configuration of a phase control switching system according to a fourth embodiment of this invention.

FIG. 7 shows a phase control switching system according to a further embodiment of this invention, and a circuit breaker. In the illustration, the same numerals as those in FIG. 1 signify the same or equivalent parts. In FIG. 7, a pressure measuring section 81 measures a puffer pressure of an insulating gas in the circuit breaker 2 which is in operation, and a travel measuring section 82 is provided in the circuit breaker operating box 3 for measuring an operation record of the stroke of the circuit breaker 2.

Now, a description will be given hereinbelow of its operation.

The current between the movable side terminal and the fixed side terminal of the circuit breaker 2 connected to a power bus 5 or the current gradient is measured by a current measuring section 71 or a current gradient measuring section 72, while the measured current value or current gradient value is converted into a voltage which in turn, is inputted to a reference phase detecting section 41A.

In the case where an opening command is given to the circuit breaker 2 and the direct-current component of the current to be broken is small, the reference phase detecting section 41A measures the current zero point and the current gradient zero point in each phase to detect the reference point at every ¼ cycle, or if the direct-current component of the current to be broken is large, it measures the current values at the current gradient zero points in each phase or the current values at which the current gradient is at a maximum and is at a minimum, thereby detecting a reference phase current waveform.

As well as the first embodiment, a control section 42A for each phase sets the time point, i.e., the reference point, serving as a reference for the current zero point or the like to be estimated on the basis of the measured reference (current and current gradient) zero points at every ¼ cycle or the measured reference phase current waveform.

At the same time, a signal is outputted from the reference phase detecting section 41A to the control section 42A for each phase, with the control section 42A calculating the corresponding opening operation time in each phase for the circuit breaker 2.

Subsequently, the desired breaking point to be estimated after the elapse of the breaking time, being the predetermined arcing time plus the opening operation time, from the reference point is set so that the current zero point is reached at the point of time of the elapse of the predetermined arcing time when each phase provides no-re-ignition or the arcing time optimal to break the short-circuit fault current, and the operating synchronization time (control time) is calculated in such a way that the breaking time is subtracted from the time from the reference point to the desired breaking point so that a control operation command is outputted to the circuit breaker 2 after the elapse of the operating synchronization time from the reference point, thus starting the operation of the circuit breaker 2.

The circuit breaker 2, after the starting of the operation under this opening control, separates its contacts after the opening operation time, and each phase reaches the breaking point after the predetermined arcing time. At this time, the stroke operation history is measured by the travel measuring section 82 and is recorded. Further, the puffer pressure at the operation is measured by the pressure measuring section 81 and the pressure variation history is recorded.

The control section 42A compares the operation history data and the puffer pressure variation history with the data in a healthy area obtained by the tests in a factory and, if they are deviated therefrom, outputs and displays the possible causes to troubles and additionally indicates the need for the maintenance and inspection.

Figure 8:
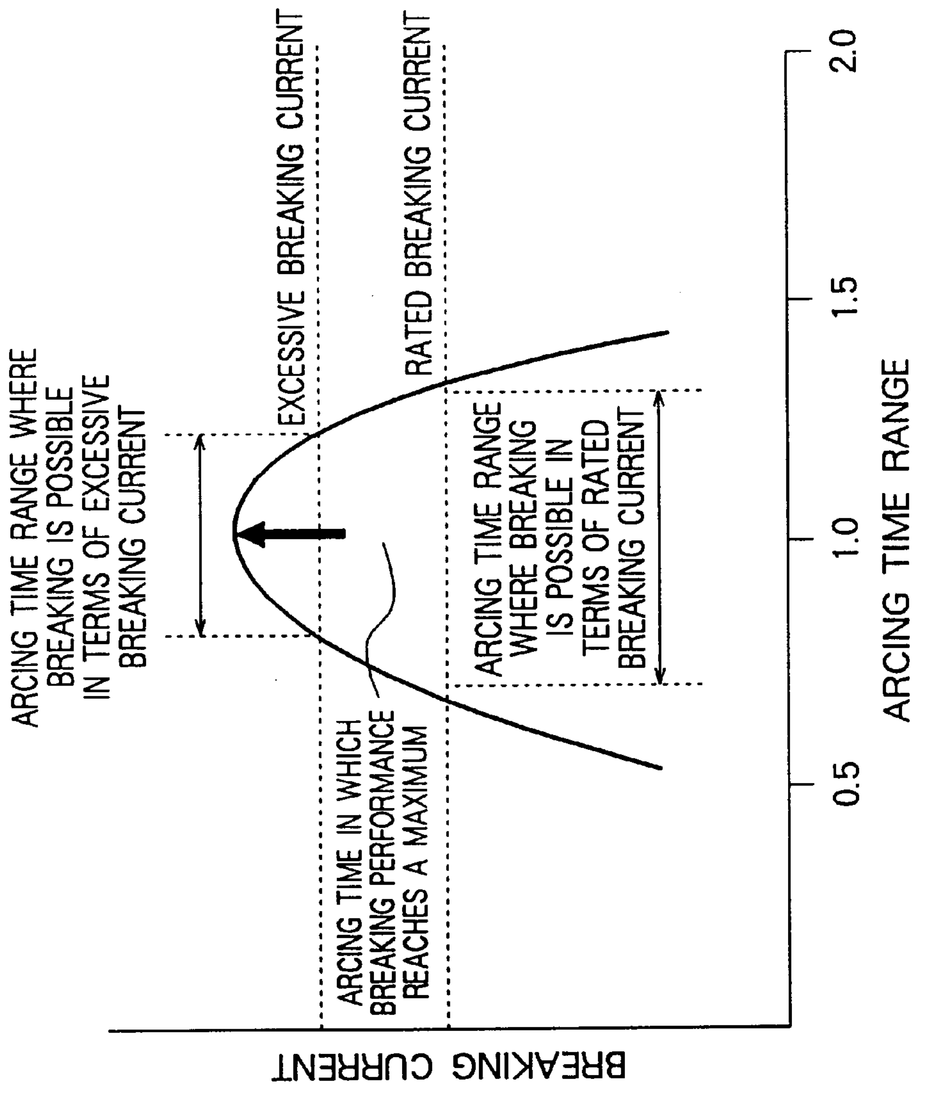
FIG. 8 is an illustration of a correlation between a critical breaking current and arcing time length in the fourth embodiment.

FIG. 8 is an illustration of a critical breaking current dependency relative to an arcing time in the circuit breaker 2. The circuit breaker 2 has an arcing time range where the breaking above 0.5 cycle is possible at a rated breaking current. This arcing time range gradually decreases as the breaking current value becomes greater. Further, the peak point of the breaking performance resides before and after 1 cycle.

That is, with the phase control switching system according to this embodiment, even if the short-circuit fault current is an asymmetrical excessive current including a direct-current component, a greater current can be broken in such a manner that the breaking point is controlled to the time point at which the breaking performance of the circuit breaker 2 comes to a maximum.

In addition, since, at the same time, the effective value of the short-circuit fault current or the current zero point is estimable, it is possible to avoid the situation in which the opening is made with an excessive breaking current exceeding the ability of the circuit breaker 2 or is made in the time period in which no current zero point exists.

Fifth Embodiment

Figure 9:
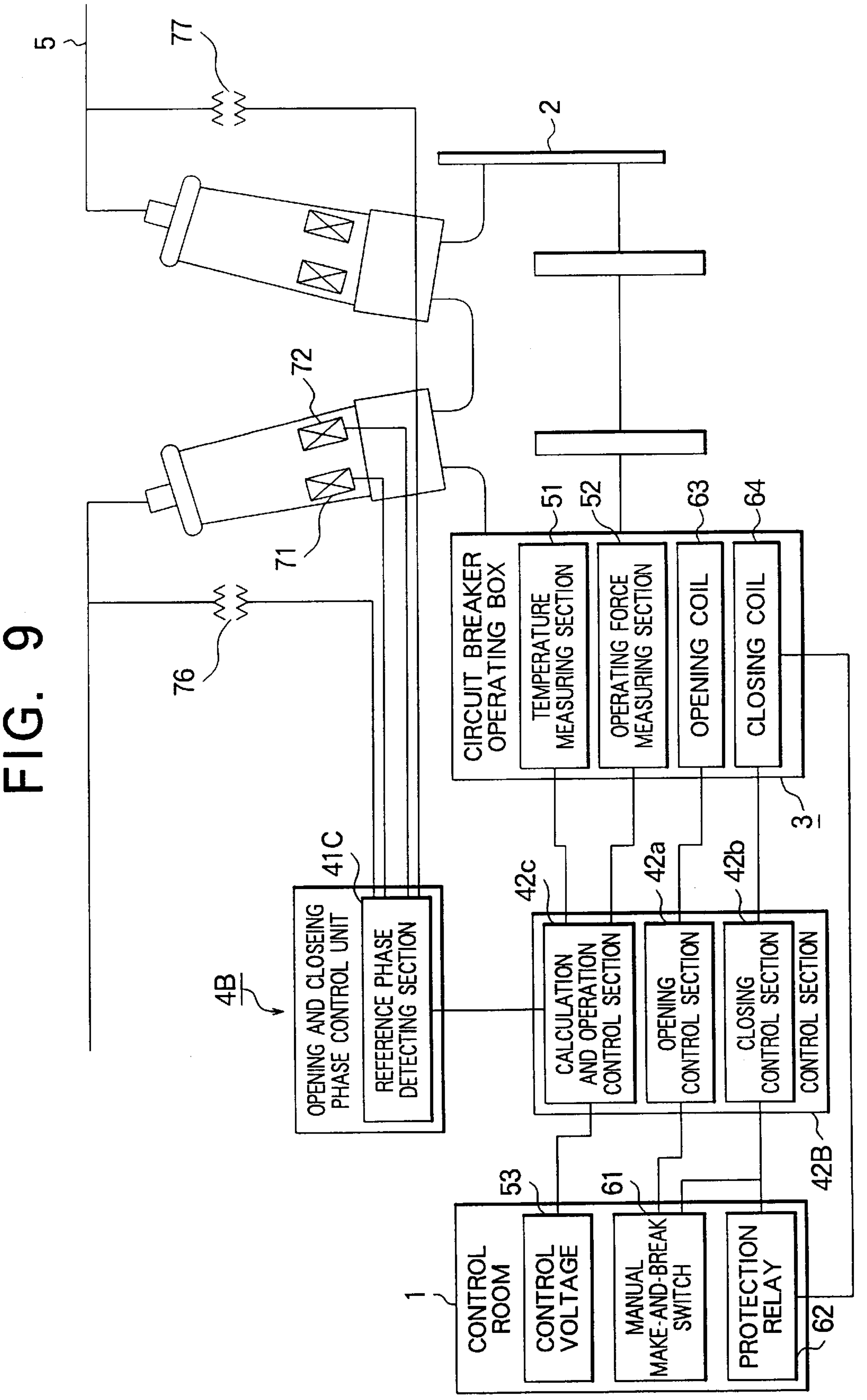
FIG. 9 is an illustration of a configuration of a phase control switching system according to a fifth embodiment of this invention.
Figure 10:
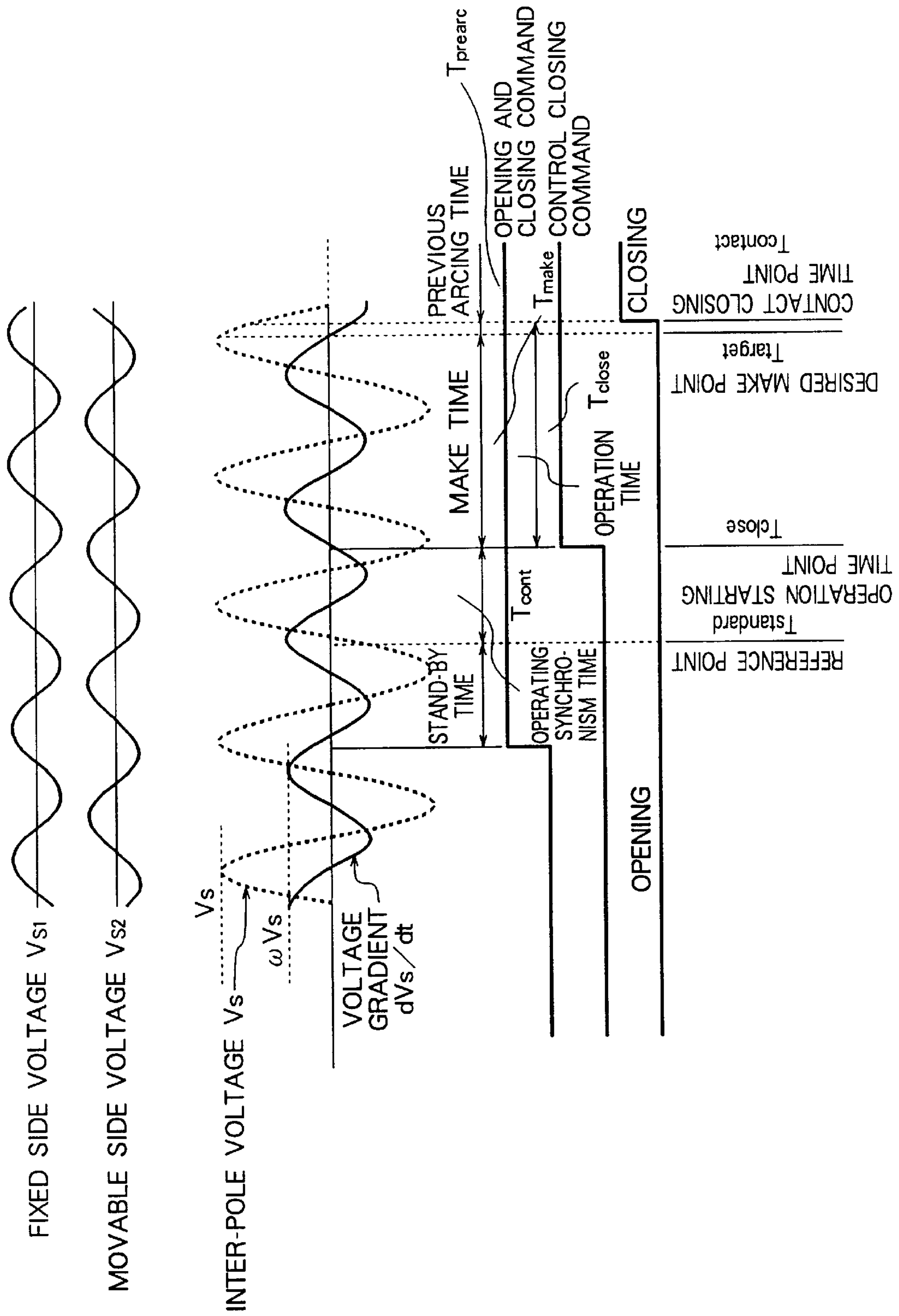
FIG. 10 illustratively shows a reference voltage waveform, an operating time point and an operation time at a closing operation by a phase control switching system according to the fifth embodiment of this invention.

Furthermore, referring to the drawings, a description will be made hereinbelow of a phase control switching system according to a fifth embodiment of this invention. FIG. 9 shows the phase control switching system according to this embodiment, while FIG. 10 illustratively shows a reference voltage waveform, an operation time point and an operation time at an opening operation. In these illustrations, the same numerals as those in FIG. 1 signify the same or equivalent sections.

In the illustrations, the reference numeral 4B represents an opening and closing phase control unit according to this embodiment, while numeral 41C designates a reference phase detecting section in this embodiment and numeral 42B denotes a control section for each phase in this embodiment. The control section 42B is composed of a calculation and operation control section 42*c* for calculating an operation time or the like for the circuit breaker 2, an opening control section 42*a* for issuing a control opening command to an opening coil 63, and a closing control section 42*b* for issuing a control closing command to a closing coil 64.

A voltage measuring section 76 is connected to the fixed side of the circuit breaker 2 for measuring a fixed side voltage Vs1 and a voltage gradient, and a voltage measuring section 77 is connected to the movable side of the circuit breaker 2 for measuring a movable side voltage Vs2 and a voltage gradient.

Now, a description will be given hereinbelow of an operation of this embodiment.

A current flowing between the terminals of the circuit breaker 2 connected to the power system 5 or a current gradient is measured by a current measuring section 71 or a current gradient measuring section 72, and the measured current value or current gradient value is converted into a voltage which in turn is inputted to the reference phase detecting section 41C.

Likewise, the fixed side voltage Vs1, the voltage gradient dVs1/dt measured by the voltage measuring section 76 and the movable side voltage Vs2, the voltage gradient dVs2/dt measured by the voltage measuring section 77 are converted into voltages which are easy to process, and then inputted to the reference phase detecting section 41C.

The reference phase detecting section 41C calculates an inter-pole (contact) voltage VS by making a subtraction between the converted fixed side voltage Vs1 and the converted movable side voltage Vs2 and further calculates an inter-pole voltage gradient dVs/dt by making a subtraction between the converted fixed side voltage gradient dVs1/dt and the converted movable side voltage gradient dVs2/dt, and additionally detects the zero point of the inter-pole voltage Vs and the zero point of the inter-pole voltage gradient dVs/dt. This calculation is made in terms of each of the phases.

In the case where a closing command is issued to the circuit breaker 2, if a voltage is applied to only one end of the circuit breaker 2, or if the inter-pole voltage zero point and the inter-pole voltage gradient zero point are reached periodically, the reference phase detecting section 41C measures the voltage zero point and the voltage gradient zero point in each phase to detect a reference point occurring at every ¼ cycle.

On the other hand, in the case where a voltage is applied to electric lines on both sides of the circuit breaker 2 introduced and the inter-pole voltage zero point and the inter-pole voltage gradient zero point are reached aperiodically, the reference phase detecting section 41C detects the inter-pole voltage zero point and the inter-pole voltage gradient zero point, particularly the period in which the amplitude of the inter-pole voltage becomes small (see FIG. 11), on the basis of the amplitudes and the periods of the inter-pole voltage and the inter-pole voltage gradient.

The calculation and operation control section 42*c* in the control section 42B for each phase sets a time point, i.e., a reference point Tstandard, forming a reference for a voltage zero point or the like to be estimated on the basis of the reference (voltage and voltage gradient) zero point at every ¼ cycle measured by the reference phase detecting section 41C or the measured inter-pole voltage waveform (that is, aperiodic inter-pole voltage zero point and voltage gradient zero point).

At the same time, the reference phase detecting section 41C generates a signal to the calculation and operation control section 42*c* in the control section 42B for each phase to make the closing control section 42*a* calculate a closing operation time Tclose of the circuit breaker 2 in each phase.

Following this, the calculation and operation control section 42*c* in the control section 42B sets a desired make point on the basis of the periodic and aperiodic inter-pole voltage zero point Tai to be estimated in each phase, and further sets a desired make point Ttarget to be estimated after the elapse of the make time from the reference point Tstandard in consideration of a predetermined previous arcing time Tprearc and a closing operation time Tclose.

Thereafter, the calculation and operation control section 42*c* calculates an operating synchronization time (control time) Tcont by subtracting an operation time Tclose from the time from the reference point Tstandard to the desired make point Ttarget and further by adding the previous arcing time Tprearc to the subtraction result, and outputs a control operation command to the circuit breaker 2 after the elapse of the operating synchronization time Tcont from the reference point Tstandard, thereby starting the operation of the circuit breaker 2.

After starting the operation under this opening control, the circuit breaker 2 is made electrically conductive at the time point when the voltage applied to between the contacts exceeds the withstand voltage depending on the distance between the contacts, that is, at the time point obtained by subtracting the previous arcing time Tprearc from a mechanical contact closing time point Tcontact, after the closing operation time Tclose.

If the inter-pole voltage is measured and an opening and closing phase control system operating on the basis of this inter-pole voltage is applied to a phase control switching system, when a voltage is applied to one end of the circuit breaker 2 or when a voltage is applied to both ends of the circuit breaker 2, the circuit breaker 2 is made conductive at the optimal timing on the inter-pole voltage, which suppresses the surge with high reliability.

Also in the case where a periodic voltage zero point is reached, by the employment of the inter-pole voltage zero point and current zero point detecting technique, as compared with the method of using the voltage and current zero points as the references wherein the reference point is reached at every ½ cycle (every 10 ms in a 50-Hz system, every 8.3 ms in a 60-Hz system), the reference point is reached at every ¼ cycle (every 5 ms in a 50-Hz system, every 4.2 ms in a 60-Hz system), and hence, the reference time point setting,control can be done with higher accuracy.

Sixth Embodiment

Figure 12:
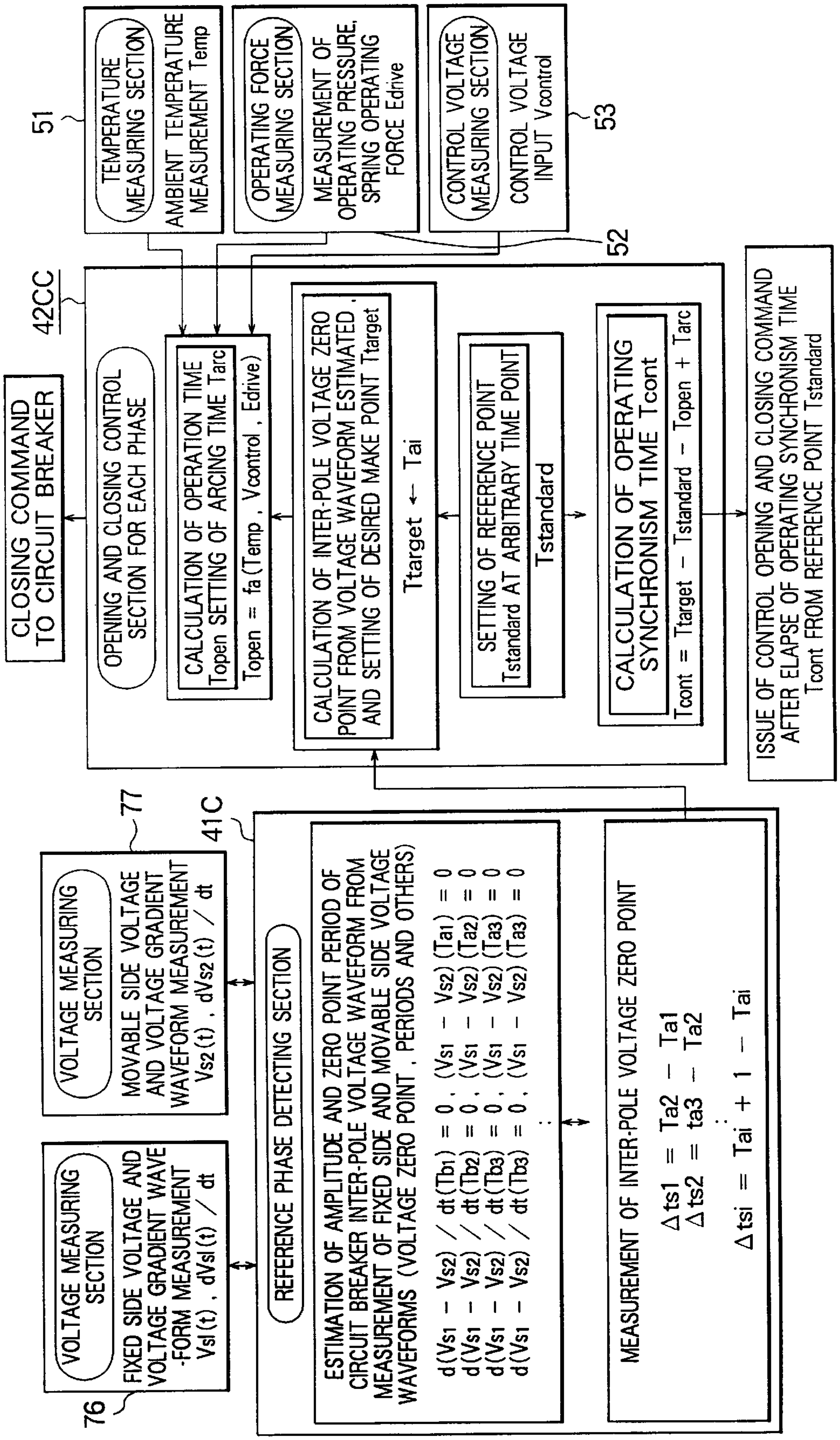
FIG. 12 is an,illustration of a closing operation sequence by a phase control switching system according to the sixth embodiment (both ends asynchronous)
Figure 13A:
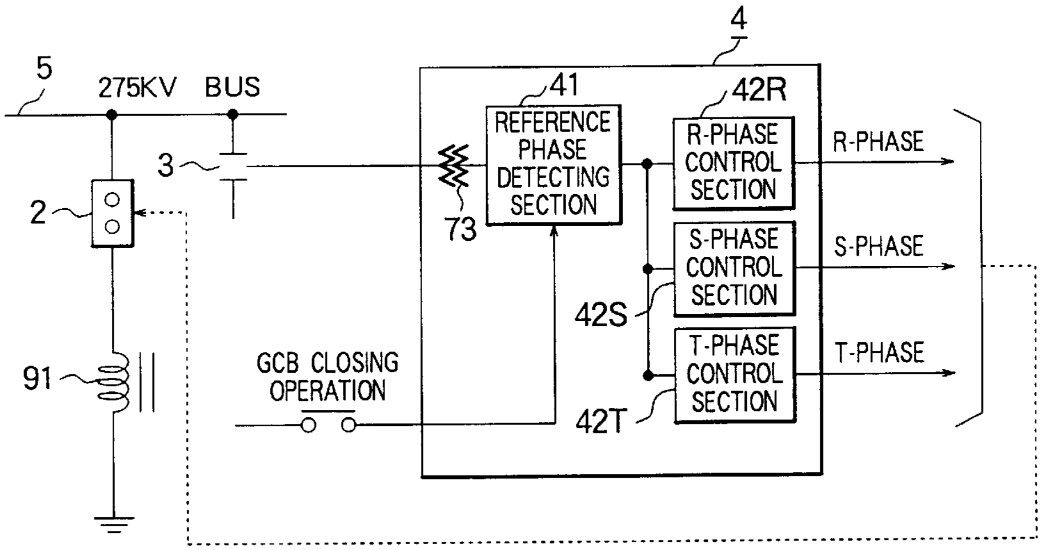
FIG. 13A PRIOR ART
FIG. 13 is an illustration of a conventional opening and closing phase control system.
Figure 13B:
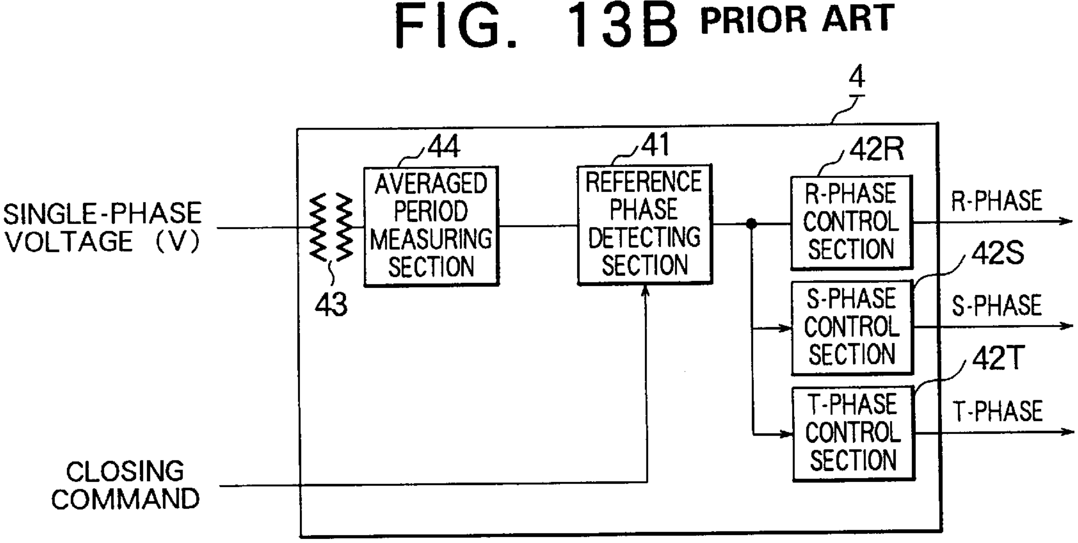
FIG. 13B PRIOR ART
Figure 14:
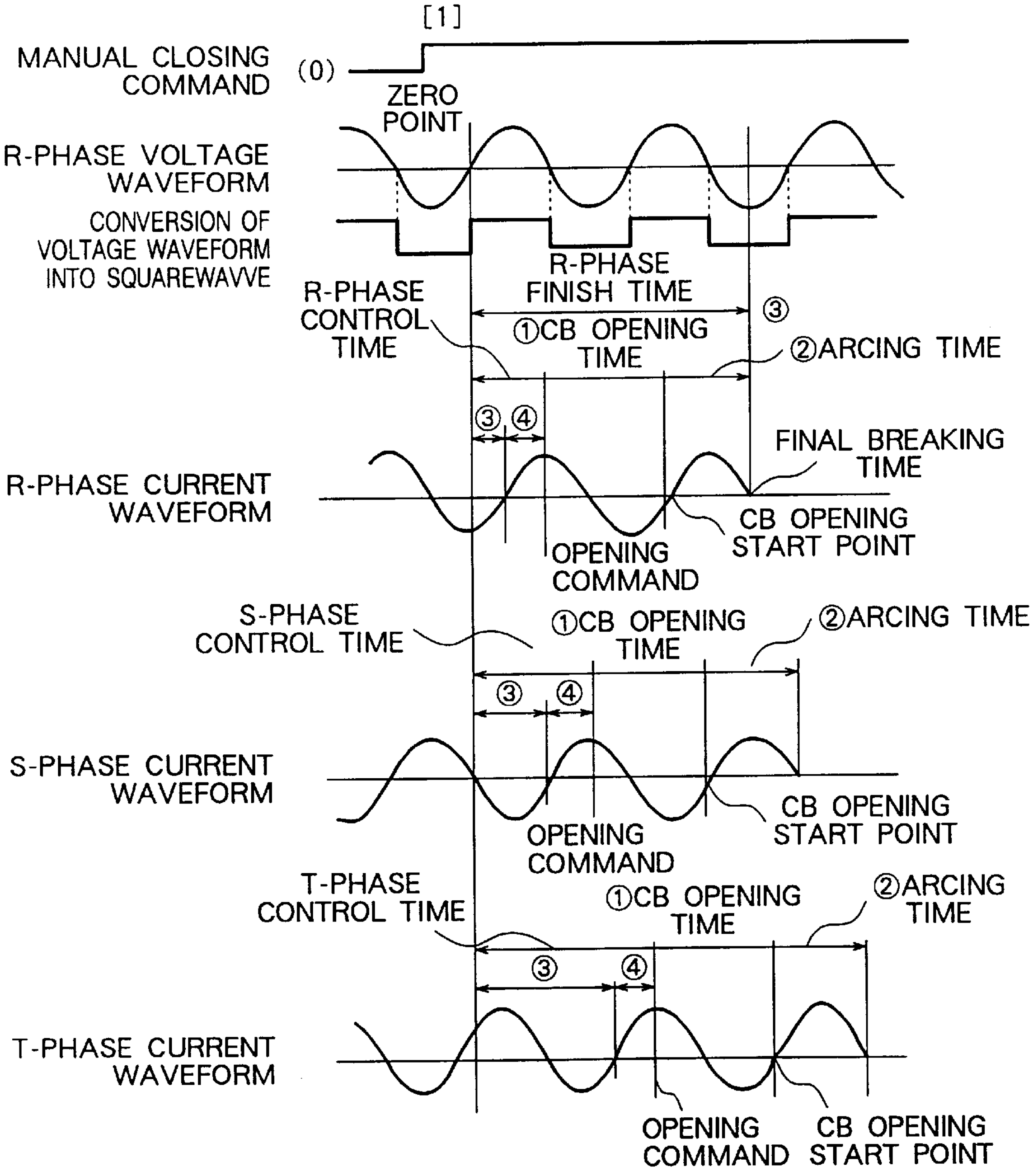
FIG. 14 PRIOR ART
FIG. 14 illustratively shows a reference current waveform, an operating time point and an operation time at an opening operation by a conventional opening and closing phase control system.
Figure 15:
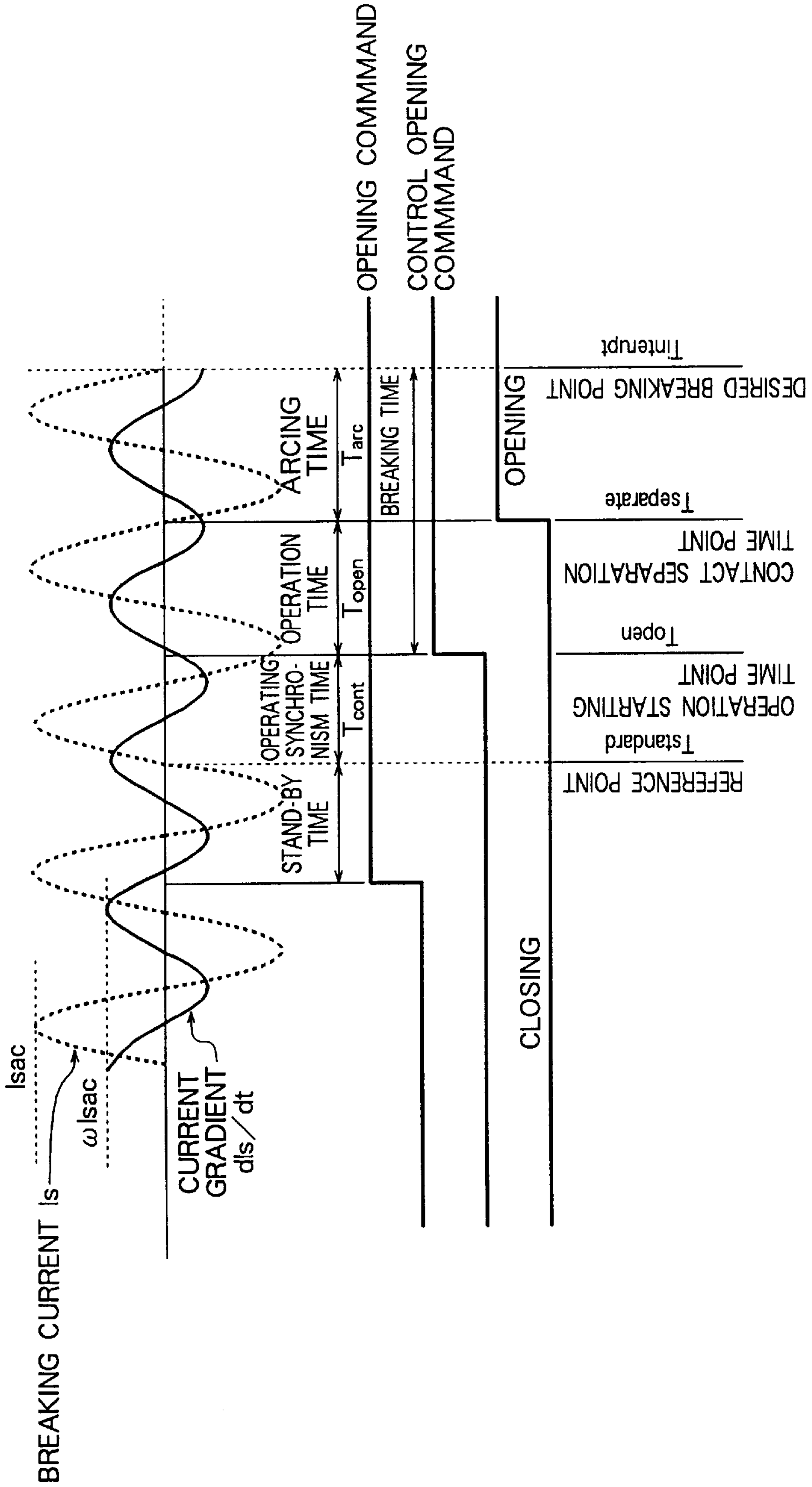
FIG. 15 PRIOR ART
FIG. 15 illustratively shows a reference current waveform, an operating time point and an operation time at an opening operation by a conventional opening and closing phase control system.
Figure 16:
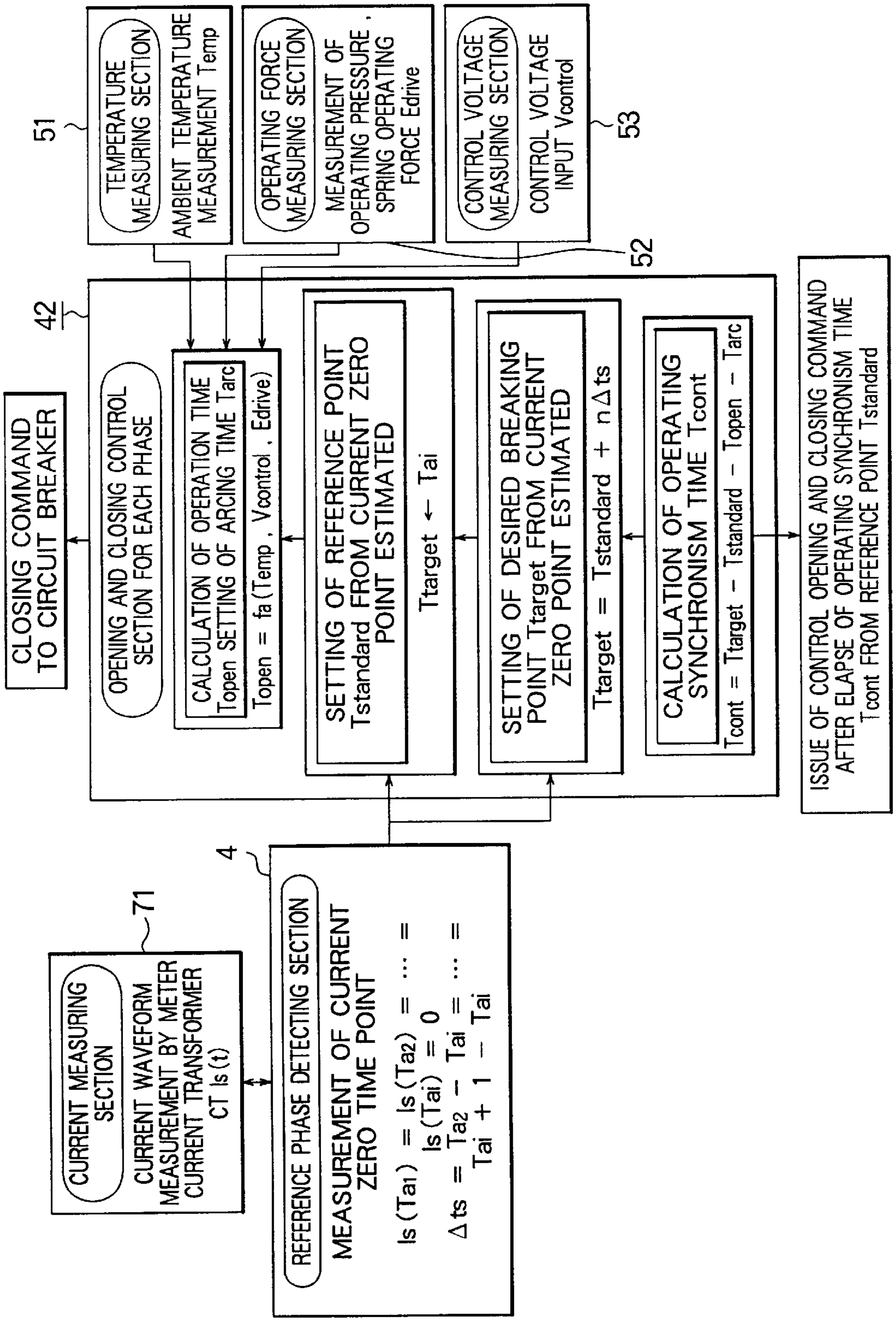
FIG. 16 PRIOR ART
FIG. 16 is an illustration of a opening sequence in a conventional opening and closing phase control system.

FIG. 12 shows a closing operation sequence for the circuit breaker 2 by a phase control switching system according to this embodiment in the case where a voltage is applied to both ends of the circuit breaker 2 and a phase difference exists between the inter-pole voltages.

Figure 11:
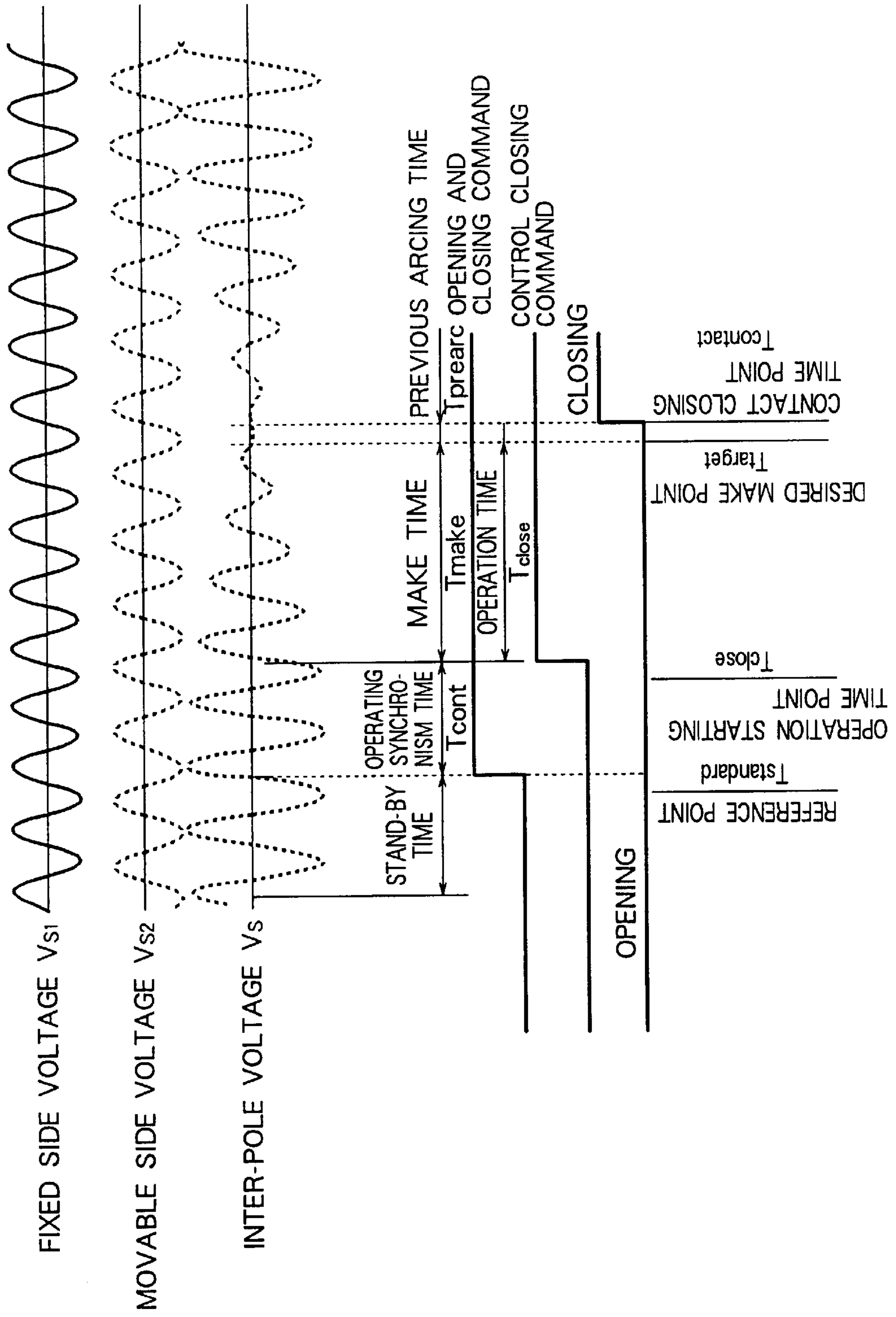
FIG. 11 illustratively shows a reference voltage waveform, an operating time point and an operation time at a closing operation by a phase control switching system according to a sixth embodiment of this invention (both ends asynchronous)

In the case of this embodiment, although the voltage and voltage gradient zero points take aperiodic condition as shown in FIG. 11, it is possible to detect the inter-pole voltage zero point by measuring the inter-pole voltage Vs and the period thereof.

Furthermore, the inter-pole voltage shows a periodically decreasing amplitude in accordance with its cycle difference. Accordingly, if a desired make point Ttarget is set in a time domain where the amplitude of the inter-pole voltage decreases, even if the closing control is slightly out of place, the surge voltage is suppressible.

Now, the closing operation of the circuit breaker 2 in this embodiment will be described hereinbelow with reference to a closing operation sequence of FIG. 12.

A voltage measuring section 76 converts the measured fixed side voltage Vs1(t) and voltage gradient dVs1(t)/dt in the circuit breaker 2 into voltages which are easy to process in a reference phase detecting section 41C, while a voltage measuring section 77 converts the detected movable side voltage Vs2(t) and voltage gradient dVs2(t)/dt in the circuit breaker 2 into voltages which are easy to process in the reference phase detecting section 41C. These converted voltages are inputted to the reference phase detecting section 41C.

When a closing command is outputted to the circuit breaker 2, the reference phase detecting section 41C estimates the amplitude of the circuit breaker inter-pole voltage waveform and the zero point period from the measurement of the fixed side and movable side voltage waveforms (voltage zero point, period and others) of the circuit breaker 2, thereafter measuring the inter-pole voltage zero point Tai from the inter-pole voltage waveform.

At the same time, an opening and closing control section 42CC in the calculation and operation control section 42*c* receives the ambient temperature Temp around the operating mechanism from a temperature measuring section 51, an operating pressure or spring operating force Edrive from an operating force measuring section 52 and a control voltage Vcontrol from a control voltage measuring section 53 in the control room 1, and calculates an operation time Topen given as a function of these in advance. A predetermined arcing time Tarc is set in advance. Further, it calculates an inter-pole voltage zero point from a voltage waveform to be estimated to appear at the occurrence of a closing command to the circuit breaker 2 on the basis of the calculated inter-pole voltage zero point and sets a desired make time point Ttarget.

Following this, a reference point Tstandard at an arbitrary time point is set, and an operating synchronization time Tcont is calculated according to an equation (Ttarget−Tstandard−Topen+Tarc). Further, a control opening command is issued to the circuit breaker 2 at an operation start time point Tclose after the elapse of the operating synchronization time Tcont from the reference point Tstandard at the arbitrary time point, thereby starting the opening operation of the circuit breaker 2.

The closing of the circuit breaker 2 is completed at a contact closing time point Tcontact after the elapse of the operation time Tclose.

With the phase control switching system according to this invention, the following outstanding advantages are attainable.

The phase control switching system comprises a phase control switching system comprises a power switching device provided in a power system for breaking a current including a short-circuit fault current and a load current or introducing it into a system voltage in response to an opening and closing command, waveform measuring means for measuring one of a,voltage waveform and a current waveform the power switching device makes and breaks, current zero point estimating means for estimating a plurality of zero points of a current with a commercial frequency on the basis of the measured one of the voltage waveform and the current waveform, parameter measuring means for measuring parameters which affect an operation time of an operating mechanism of the power switching device, operation time estimating means for estimating an opening operation time of the power switching device on the basis of the measured parameters, current zero point selecting means for setting a breaking time comprising a predetermined arcing time plus the opening operation time, so that a breaking point forming a current zero point is reached at the point of time of the elapse of the predetermined arcing time, the zero point selecting means being further operable to select that one current zero point from the plurality of current zero points which is estimated to occur after the elapse of the set breaking time from a present reference time point to set the selected current zero point as a desired breaking point, and operation starting means for calculating an operating synchronization time on the basis of the breaking time and a difference between a time from the present reference time point to the desired breaking time, and for outputting a control operation command to the power switching device after the elapse of the operating synchronization time from the reference time point so that the power switching device starts its operation. Thus, upon receipt of the opening and closing command, the opening phase control operation using an arbitrary time point as a reference can be conducted after the estimation of the current waveform, which allows the short-circuit fault current or the load current to be broken in a predetermined arcing time with higher accuracy for shorter control time. In addition, the phase control switching system includes current waveform estimating means for measuring a current to be broken on the basis of the current waveform measured by the waveform measuring means and further for calculating a wave height of an alternating-current component of the breaking current, a current phase thereof, a direct-current component thereof to be superimposed on the breaking current and an attenuation time constant of the direct-current component on the basis of the measured current to estimate an asymmetrical current waveform, wherein the current zero point selecting means sets the breaking time to the predetermined arcing time plus the opening operation time, so that the current zero point is reached at the elapse of the predetermined arcing time, and selects one current zero point from the plurality of current zero points calculated on the basis of, a wave height value of an alternating-current component of the breaking current occurring after the elapse of the breaking time set from an arbitrary reference time point, a current phase thereof, a direct-current component thereof to be superimposed on the breaking current and the attenuation time constant of the direct-current component, and sets the selected current zero point as the desired breaking point. Thus, particularly, even in the case of breaking a short-circuit fault current including a high direct-current component, it is possible to break at the time point that the current zero point is reached at the point of time of the elapse of a predetermined arcing time. Furthermore, in the case where an accident current or a load current is broken, the effective value of the breaking current is estimated so that the arcing time from the opening time point to the current zero point is set to be within an arcing time range where the power switching device is capable of taking a breaking action, and is as short as possible, or so that the breaking is made for the arcing time maximizing the breaking performance of the power switching device. Thus, if the arcing time from the opening time point to the current zero point is set to be as short as possible within an arcing time range in which the circuit breaker can take the breaking action, it is possible to hold the damages to the expendable parts of the circuit breaker down to a minimum. Still further, in the case where an excessive accident current exceeding a rated value flows, braking is set for the arcing time where the power switching device shows the highest breaking performance to make a decision on whether the breaking is possible or not, before an operation command is issued. Thus, it is possible to avoid the impossibility of the breaking. Besides, in the case where a short-circuit fault current, a leading current or a reactor current is broken, the opening time point is set to the current zero point. Thus, in the case of breaking the short-circuit fault current, the leading current or the reactor current, the opening time point is set at the current zero point, so that, at the shunt reactor breaking, the insulation distance between the contacts of the circuit breaker in each phase is sufficiently securable and the breaking is made in the arcing time of ½ cycle, which causes no occurrence of re-ignition, and further, at the short-circuit fault current breaking, the breaking is made in the arcing time of 1 cycle where the circuit breaker provides the highest breaking performance. Furthermore, a phase control switching system comprises a power switching device provided in a power system for breaking a short-circuit fault current, a load current or the like or introduce it into a system voltage in response to an opening and closing command, voltage waveform measuring means for measuring a voltage or current waveform the power switching device makes and breaks, voltage zero point estimating means for estimating the times of a plurality of periodic inter-pole voltage zero points on the basis of the measured voltage or current waveform, means for measuring parameters, such as various main temperatures, an operating force and a control voltage, which affect an operation time of an operating mechanism of the power switching device, operation time estimating means for estimating an opening operation time on the basis of the parameter values measured, make time setting means for, in consideration of a predetermined previous arcing time, setting a make time obtained by subtracting the previous arcing time from a closing operation time so that the power switching device is electrically turned on at a predetermined make time point, desired breaking point selecting means for selecting one time point from set make electric angles set to occur after the elapse of the set make time from a present reference time point and for setting the selected time point as a desired breaking point, and operation starting means for subtracting the make time from the time from the present reference time point to the desired breaking point and further for adding the previous arcing time to the subtraction result to calculate an operating synchronization time, and still further for issuing a control operation command to the power switching device after the elapse of the operating synchronization time from the reference time point to start an operation of the power switching device. Thus, the inter-pole voltage zero point can be estimated with high accuracy on the basis of these measured values and, upon receipt of an opening and closing command, the opening phase control operation using an arbitrary time point as a reference can be conducted after the estimation of the voltage waveform, therefore the make can be made for a shorter control time at the time point when the make surge is small. Still further, the phase control switching system comprises inter-pole voltage measuring means for measuring, on the basis of an inter-pole voltage obtained by making a subtraction between a movable side voltage waveform and a fixed side voltage waveform in the power switching device measured by the voltage waveform measuring means, an amplitude of the inter-pole voltage and an inter-pole voltage zero point, and make time point setting means for, when the measured inter-pole voltage amplitude varies, estimating a time period in which the amplitude becomes the lowest and a voltage zero point in this time period to set this point as a make time point, wherein the desired breaking point selecting means, in consideration of the similarly predetermined previous arcing time, sets the make time obtained by subtracting the previous arcing time from the closing operation time so that the switching device is electrically turned on at the set make time point, and further, selects one time point from the make electric angles set to occur after the elapse of the set make time from the present reference time point to set the selected time point as the desired breaking point. Thus, even if the period of the voltage applied to both ends of the circuit breaker is out of place, the surge suppression becomes possible. Besides, the phase control switching system comprises operational characteristic measuring means for measuring a puffer pressure variation characteristic and an operational characteristic when the power switching device is in operation, decision means for deciding whether or not the rise value of the puffer pressure or an operating speed is out of a predetermined reference range, operational characteristic estimating means for estimating the next puffer pressure or operational characteristic on the basis of a past operation record (history), and display means for, when the next operational characteristic is estimated to be out of the predetermined reference range, displaying the inspection timing for replacement or the like of expendable parts in the switching device and the necessity for inspection of the operating mechanism. Thus, instead of the conventional periodic inspection, the maintenance and inspection at a necessary time becomes possible, and therefore, the extension of the inspection interval and the reduction of the accident rate are expectable. Additionally, since, at the same time the effective value of the short-circuit fault current and the current zero point are estimable, it is possible to avoid a situation in which the opening is made with an excessive breaking current exceeding the ability of the circuit breaker or is made during the time period in which no current zero point exist, which causes the impossibility of breaking. It should be understood that the foregoing relates to only preferred embodiments of the present invention, and that it is intended to cover all changes and modifications of the embodiments of the invention herein used for the purpose of the disclosure, which do not constitute departures from the spirit and scope of the invention.

What is claimed is:

1. A phase control switching system comprising:

a power switching device provided in a power system for breaking a current including a short-circuit fault current and a load current or introducing it into a system voltage in response to an opening and closing command;

waveform measuring means for measuring one of a voltage waveform and a current waveform said power switching device makes and breaks;

current zero point estimating means for estimating a plurality of zero points of a current with a commercial frequency on the basis of the measured one of said voltage waveform and said current waveform;

parameter measuring means for measuring parameters which affect an operation time of an operating mechanism of said power switching device;

operation time estimating means for estimating an opening operation time of said power switching device on the basis of the measured parameters;

current zero point selecting means for setting a breaking time comprising a predetermined arcing time plus said opening operation time, so that a breaking point forming a current zero point is reached at the point of time of the elapse of said predetermined arcing time, said zero point selecting means being further operable to select that one current zero point from said plurality of current zero points which is estimated to occur after the elapse of the set breaking time from a present reference time point to set the selected current zero point as a desired breaking point; and operation starting means for calculating an operating synchronization time on the basis of said breaking time and a difference between a time from said present reference time point to said desired breaking time, and for outputting a control operation command to said power switching device after the elapse of said operating synchronization time from said reference time point so that said power switching device starts its operation.

2. A phase control switching system according to claim 1, further comprising current waveform estimating means for measuring a current to be broken on the basis of said current waveform measured by said waveform measuring means and further for calculating a wave height of an alternating-current component of the breaking current, a current phase thereof, a direct-current component thereof to be superimposed on the breaking current and an attenuation time constant of said direct-current component on the basis of the measured current to estimate an asymmetrical current waveform, wherein said current zero point selecting means sets the breaking time to said predetermined arcing time plus said opening operation time, so that the current zero point is reached at the elapse of said predetermined arcing time, and selects one current zero point from said plurality of current zero points calculated on the basis of, a wave height value of an alternating-current component of the breaking current occurring after the elapse of the breaking time set from an arbitrary reference time point, a current phase thereof, a direct-current component thereof to be superimposed on the breaking current and the attenuation time constant of the direct-current component, and sets the selected current zero point as said desired breaking point.

3. A phase control switching system according to claim 1, wherein, in the case where one of an accident current and a load current is broken, an effective value of the breaking current is estimated so that said arcing time from an opening time point to the current zero point is set to take a minimum length within an arcing time range where said power switching device achieves breaking, or so that the breaking is made for said arcing time that maximizes a breaking performance of said power switching device.

4. A phase control switching system according to claim 1, wherein, in the case where an excessive accident current exceeding a rated value flows, said arcing time is set to maximize said breaking performance of said power switching device and a decision is made on whether the breaking is possible or not, before an operation command is issued.

5. A phase control switching system according to claim 1, wherein, in the case where at least one of a short-circuit fault current, a leading current and a reactor current is broken, said opening time point is set to said current zero point.

6. A phase control switching system according to claim 1, further comprising:

operational characteristic measuring means for measuring a puffer pressure variation characteristic and an operational characteristic when said power switching device is in operation;

decision means for deciding whether or not at least one of a rise value of the puffer pressure and an operating speed is out of a predetermined reference range;

operational characteristic estimating means for estimating at least one of the next puffer pressure or operational characteristic on the basis of a past operation record; and display means for, when the next operational characteristic is estimated to be out of the predetermined reference range, displaying an inspection timing for replacement of expendable parts in said power switching device and the necessity for inspection of said operating mechanism.

7. A phase control switching system comprising:

a power switching device provided in a power system for breaking a current including a short-circuit fault current and a load current or introducing it into a system voltage in response to an opening and closing command;

voltage waveform measuring means for measuring one of a voltage waveform and a current waveform said power switching device makes and breaks;

voltage zero point estimating means for estimating the time points of a plurality of periodic inter-pole voltage zero points on the basis of the measured one of said voltage waveform and said current waveform;

means for measuring parameters including main temperatures, an operating force and a control voltage which affect an operation time of an operating mechanism of said power switching device;

operation time estimating means for estimating an opening operation time on the basis of the measured parameter values;

make time setting means for, in consideration of a predetermined previous arcing time, setting a make time obtained by subtracting said previous arcing time from a closing operation time so that said power switching device is electrically turned on at a predetermined make time point;

desired breaking point selecting means for selecting one time point from make electric angles set to occur after the elapse of the set make time from a present reference time point and for setting the selected time point as a desired breaking point; and operation starting means for subtracting the make time from a time from the present reference time point to said desired breaking point and further for adding said previous arcing time to the subtraction result to calculate an operating synchronization time, and still further for issuing a control operation command to said power switching device at the point of time of the elapse of said operating synchronization time from said reference time point to start an operation of said power switching device.

8. A phase control switching system according to claim 7, further comprising:

inter-pole voltage measuring means for measuring, from an inter-pole voltage obtained by making a subtraction between a movable side voltage waveform and a fixed side voltage waveform in said power switching device measured by said voltage waveform measuring means, an amplitude of said inter-pole voltage and an inter-pole voltage zero point thereof; and make time point setting means for, when the measured inter-pole voltage amplitude varies, estimating a time period in which the amplitude becomes the lowest and a voltage zero point in said time period to set said voltage zero point as a make time point, wherein said desired breaking point selecting means, in consideration of said predetermined previous arcing time, sets said make time obtained by subtracting said previous arcing time from said closing operation time so that said power switching device is electrically turned on at the set make time point, and further, selects one time point from said make electric angles set to occur after the elapse of the set make time from the present reference time point to set the selected time point as said desired breaking point.

* * * * *